United States Patent [19]
Chase et al.

[11] Patent Number: 5,884,104
[45] Date of Patent: Mar. 16, 1999

[54] COMPACT CAMERA FLASH UNIT

[75] Inventors: Scott B. Chase; Carl F. Leidig, both of Rochester, N.Y.

[73] Assignee: Eastman Kodak Company, Rochester, N.Y.

[21] Appl. No.: 978,832

[22] Filed: Nov. 26, 1997

[51] Int. Cl.$^6$ .................................................. G03B 15/05
[52] U.S. Cl. .............................. 396/6; 396/176; 396/200
[58] Field of Search .............................. 396/6, 200, 176, 396/155; 362/16, 3

[56] References Cited

U.S. PATENT DOCUMENTS

| | | |
|---|---|---|
| 4,337,759 | 7/1982 | Popovich et al. . |
| 5,021,811 | 6/1991 | Maurinus et al. . |
| 5,160,192 | 11/1992 | Sugawara . |
| 5,329,330 | 7/1994 | Sakai et al. . |
| 5,404,869 | 4/1995 | Parkyn, Jr. et al. . |
| 5,539,622 | 7/1996 | Ishikawa .................................. 362/16 |
| 5,541,687 | 7/1996 | Pearson .................................... 396/200 |
| 5,577,492 | 11/1996 | Parkyn, Jr. et al. . |
| 5,641,218 | 6/1997 | Sakurai .................................... 362/16 |

OTHER PUBLICATIONS

Abstract, TIR Lenses for Fluorescent Lamps, SPIE Conference 2538, Jul. 11, 1995.
Abstract, JP 08334811–A, Light illumination device for photographic camera.
Optics, Eugene Hecht/Alfred Zajac, Adelphi University, pp. 81–85.

*Primary Examiner*—W. H. Perkey
*Attorney, Agent, or Firm*—Svetlana Z. Short

[57] ABSTRACT

A camera flash comprises a flash light source providing light, a and a condenser lens element. The reflector is located adjacent to one side of the flash light source and has a trough with a reflective surface oriented towards the flash light source. The reflective surface partially encloses the flash light source and extends no more than 2 millimeters beyond the flash light source towards the target surface.

26 Claims, 18 Drawing Sheets

COMPACT CAMERA FLASH UNIT

CROSS REFERENCE TO RELATED APPLICATION

This application is related to commonly assigned, copending U.S. Applications, Ser. No. 08/932,087, entitled A CAMERA FLASH UNIT INCLUDING A LENS COMPONENT WITH A TIR SURFACE, in the names of Carl F. Leidig and Scott B. Chase, filed Sep. 17, 1997.

FIELD OF THE INVENTION

The present invention relates to compact camera flash units.

BACKGROUND OF THE INVENTION

Prior art camera flash units that are integral to cameras have a flash light source 6, a reflector 3, and a refractive lens element 8 (see FIG. 1) to direct light rays generated by the flash light source towards a target surface. Such a flash unit is described in U.S. Pat. No. 5,160,192. In conventional camera flash units of the above described type, the reflector has a cup like cross-section that is approximately 7 to 10 millimeters deep. The distance between the light source 6 and the refractive lens element 8 is about 4 millimeters.

There exists a strong demand for compact cameras. Compact cameras require smaller camera flash units than the prior art camera flash units.

SUMMARY OF THE INVENTION

It is the principal object of the present invention to provide a camera flash unit that is small in the direction of its optical axis and, that provides good illumination on a target surface located 5 to 7 feet away from a camera. It is another object of the present invention to provide a reflector for a camera flash unit that takes a minimum amount of space.

Briefly described, according to one aspect of the present invention, a camera flash comprises a flash light source providing light, a reflector adapted to direct the light from the flash light source in a first direction and a lens element. The reflector is located adjacent to one side of the flash light source and has a trough with a reflective surface oriented towards the flash light source. The reflective surface partially encloses the flash light source and extends no more than 2 millimeters beyond the flash light source in the first direction. The lens element is located adjacent to another side of the flash light source. The lens element directs the light rays (1) reflected by the reflector and (2) directly incident from the flash light source in the first direction. The lens element and the trough define a distance d, where $d \leq 7$ millimeters. The distance d is measured along the optical axis of the lens element from a front vertex of the lens element to a back surface of the trough.

According to one embodiment of the present invention, the concave reflective surface has a depth of less than 2 millimeters and a radius of curvature in the range of 1 to 3 millimeters.

Also, according to one embodiment, the trough has a length of 7 to 25 millimeters.

One advantage of the camera flash unit of the present invention is that it is more compact than the camera flash units of prior art.

BRIEF DESCRIPTION OF THE DRAWINGS

The foregoing and other objects, features and advantages as well as the presently preferred embodiment thereof will become more apparent from reading of the following description in connection with the accompanying drawings.

FIG. 14A depicts the Y-Z plane. FIG. 14B depicts the X-Z plane.

FIG. 15A depicts the Y-Z plane. FIG. 15B depicts the X-Z plane.

DESCRIPTION OF THE PREFERRED EMBODIMENT

Camera Flash Unit Structure

A camera flash unit for illumination of a target surface includes a reflector having a trough and a flash light source mounted in the trough. A lens element is mounted close to the light source and directs the light provided by the light source towards a target surface. The flash unit is very compact. It is less than about 7 millimeters and preferably less than 5 millimeters deep.

Figure 2:
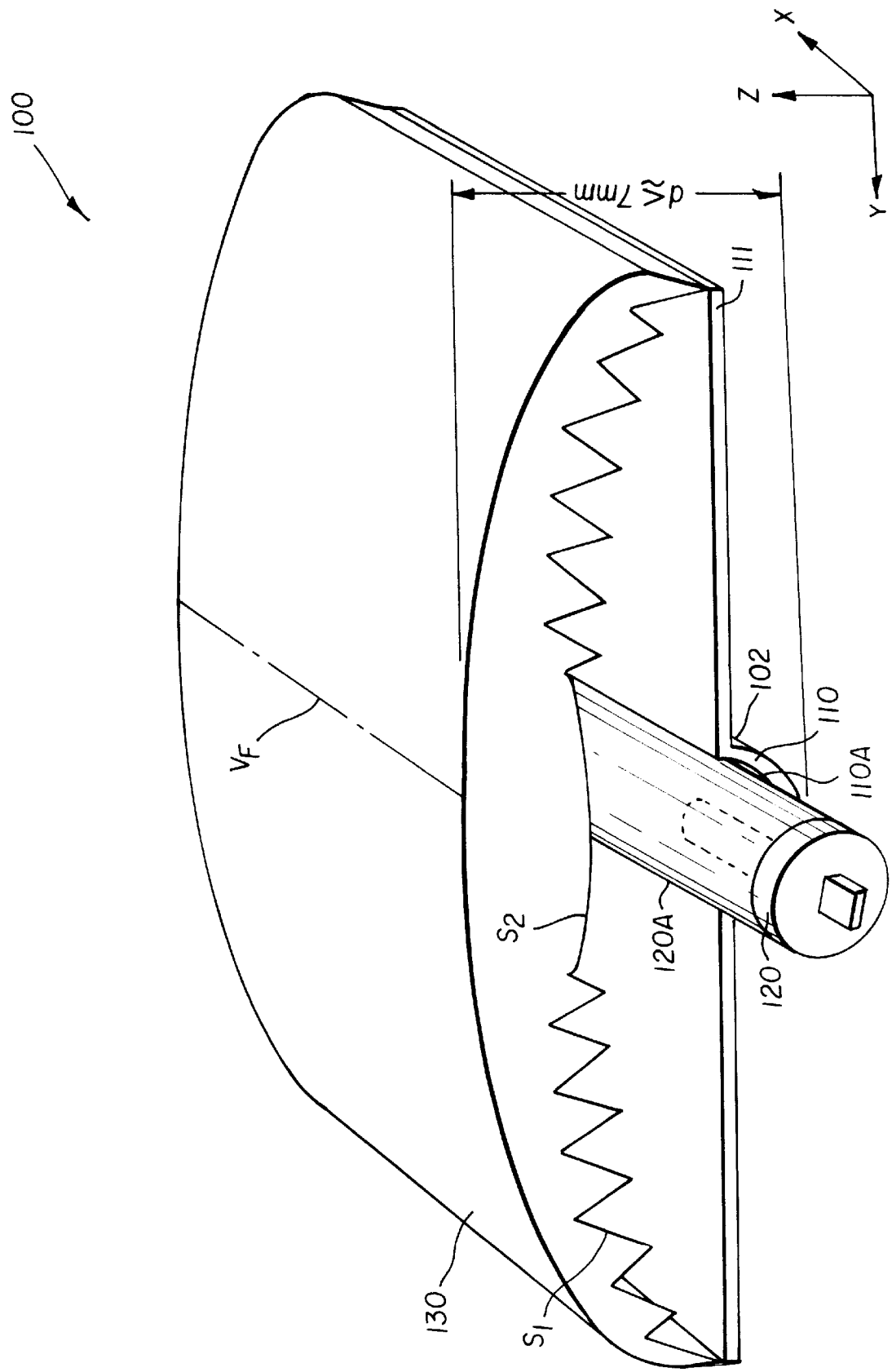
FIG. 2 is a top perspective view of a camera flash unit of a first embodiment of the present invention.
Figure 3:
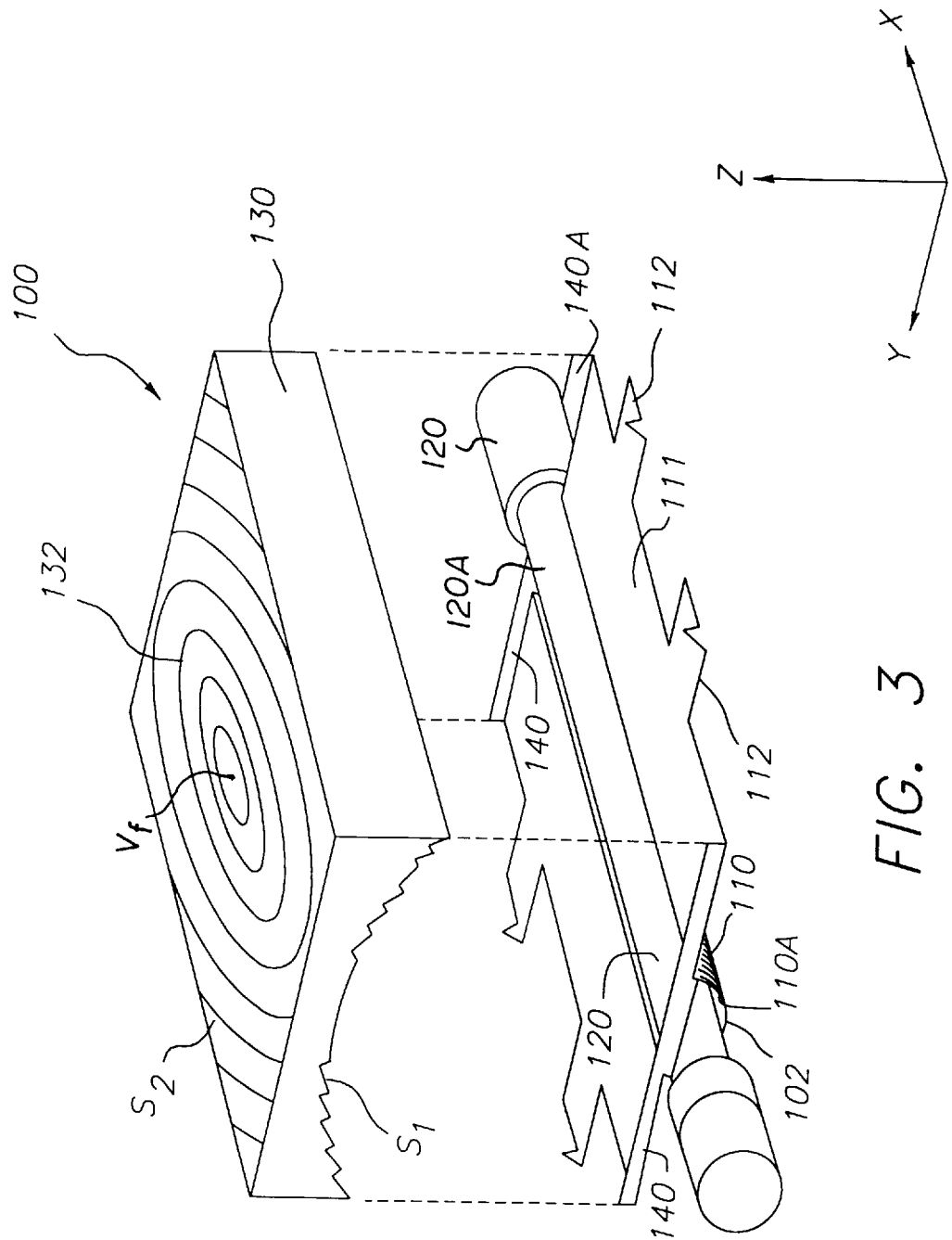
FIG. 3 is a top perspective view of a camera flash unit of another embodiment of the present invention, with a condenser lens element being shown displaced from the other elements of the camera flash unit.

More specifically, FIGS. 2 and 3 are perspective views of the camera flash unit 100. This camera flash unit includes the reflector 102 with curving walls 110 forming the trough. These walls 110 have a highly reflective surface 110A. It is preferred that this surface 110A be concave and have an approximately semi-circular cross-section. The reflector 102 may also have reflective wings 111 located adjacent to the trough. The reflective wings 111 (shown in FIGS. 2 and 3) are flat, but could also be curved. The camera flash unit 100 also includes an elongated, cylindrical flash lamp tube 120 (for use as a flash light source) and a condenser lens element 130. The cylindrical flash lamp tube 120 (a xenon flash tube, for example) is situated inside the surface 110A of the reflector. The cylindrical flash lamp tube may have a transparent, conductive coating 120A on its external surface. The condenser lens element 130 receives direct light from the cylindrical flash lamp tube 120, and the light reflected from the surface 110A of the reflector 102.

Figure 4:
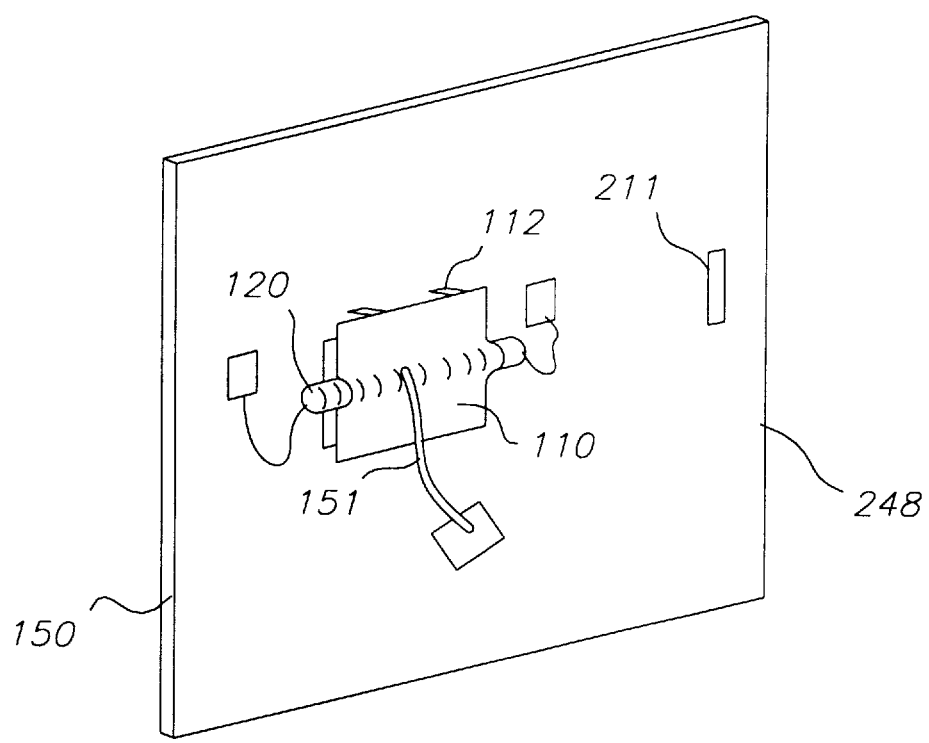
FIG. 4 is a rear perspective view of the camera flash units of FIGS. 2 and 3 mounted in a circuit board.

The camera flash unit 100 may also have optional side walls 140 (FIG. 3) that have reflective inner surface walls 140A which redirect intercepted light (coming directly from the flash lamp tube 120 as well as reflected by the highly reflective inner surface 110A) towards the target surface. The walls 110 and 140 may have one or more tabs 112 (FIG. 3), for mounting the camera flash unit on a wall 150 (FIG. 4) such as a flash board or a circuit board 248, for example. In addition, it is preferred that the camera flash unit 100 comprise a trigger wire 151 that is in contact with the reflector 102 and that the trough of the reflector 102 be in contact with the conductive coating 120A of the flash lamp tube 120 (FIG. 4). The camera flash unit may also include other conventional features associated with known camera flash units.

Figure 5:
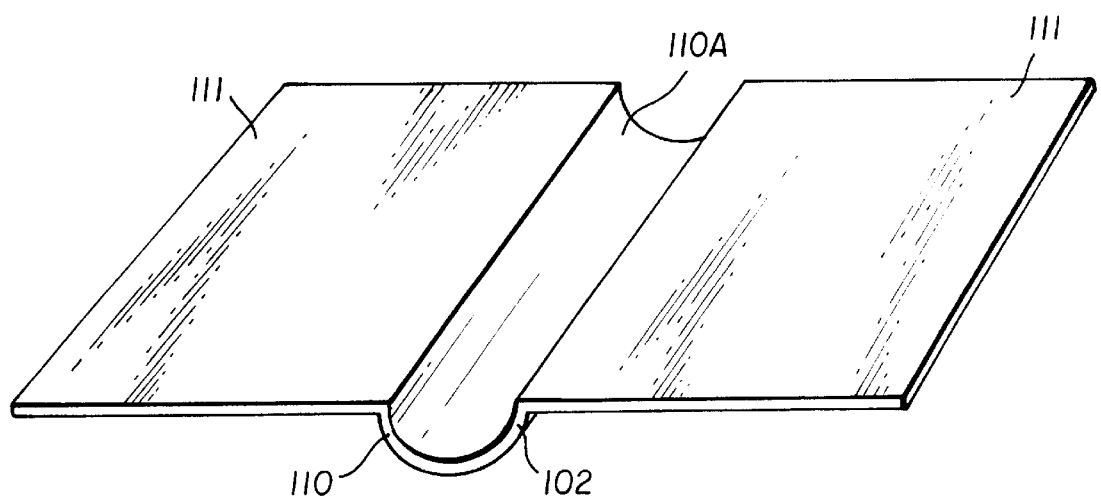
FIG. 5 illustrates one embodiment of a reflector that is usable in the camera flash units of FIGS. 2 and 3.

More specifically, FIG. 5 illustrates one embodiment of the reflector 102 of the camera flash unit illustrated in FIGS. 2 and 3. As stated above, the reflector 102 includes a trough with a concave reflective surface 110A and, also includes wings 111. These wings have a highly reflective surface that reflects some of the light emanating from the cylindrical flash lamp tube 120 and directs it towards the condenser lens element 130. The inside curvature of the walls 110 (forming the trough) is substantially the same as the outside radius of curvature of the cylindrical flash lamp tube 120 (not shown).

Figure 6:
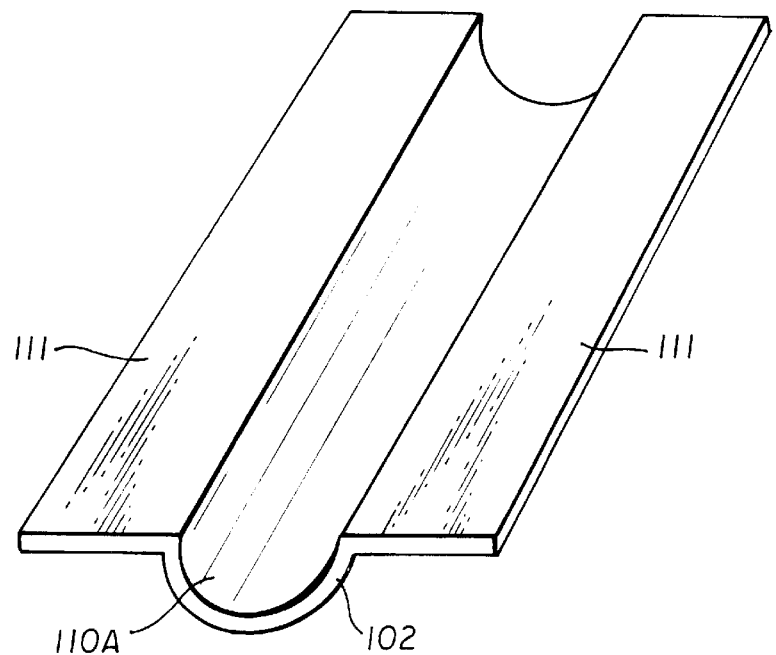
FIG. 6 illustrates a second embodiment of a reflector that is usable in the camera flash units of FIGS. 2 and 3.
Figure 7:
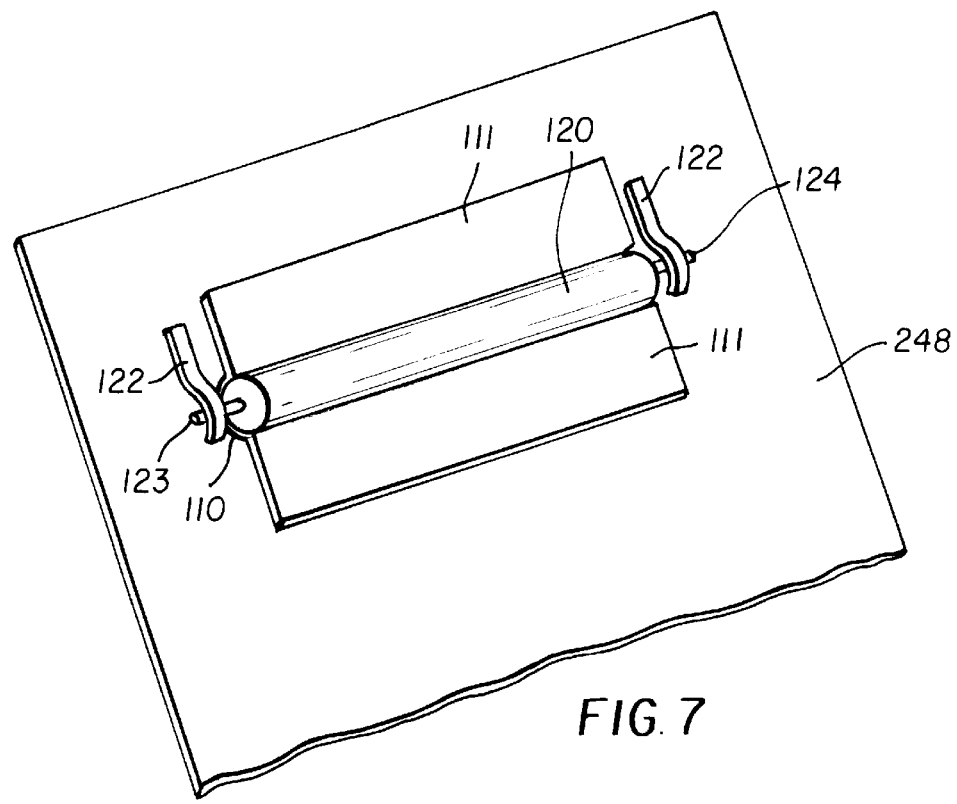
FIG. 7 illustrates a method of mounting the reflectors of FIGS. 5 and 6 and a flash lamp tube of the camera flash units of FIGS. 2 and 3 to a flash board.

FIGS. 6 and 7 illustrate a second embodiment of the reflector 102. This reflector 102 also has a trough with reflective surface 110A. The walls 110 are designed to curve around a portion of the cylindrical flash lamp tube 120 and to make a physical contact with it (FIG. 7). The trigger wire 151 contacts the walls 110 of the reflector 102 (as shown in FIG. 4) and through these walls 110 triggers the flash lamp tube 120, thereby discharging it. The reflective wings 111 of the reflector 102 of this, second embodiment are much smaller than the reflective wings 111 of the first embodiment. In the second embodiment, the reflective wings 111 are used primarily for mounting the reflector 102 to the flash board 248. The reflective wings 111 are mounted directly to the flash board 248 and are held in place by the cylindrical flash lamp tube 120. The cylindrical flash lamp tube 120 is held in position by spring clips 122 that are soldered to the anode 123 and cathode 124 of the cylindrical flash lamp tube 120. This is illustrated in FIG. 7.

Figure 8:
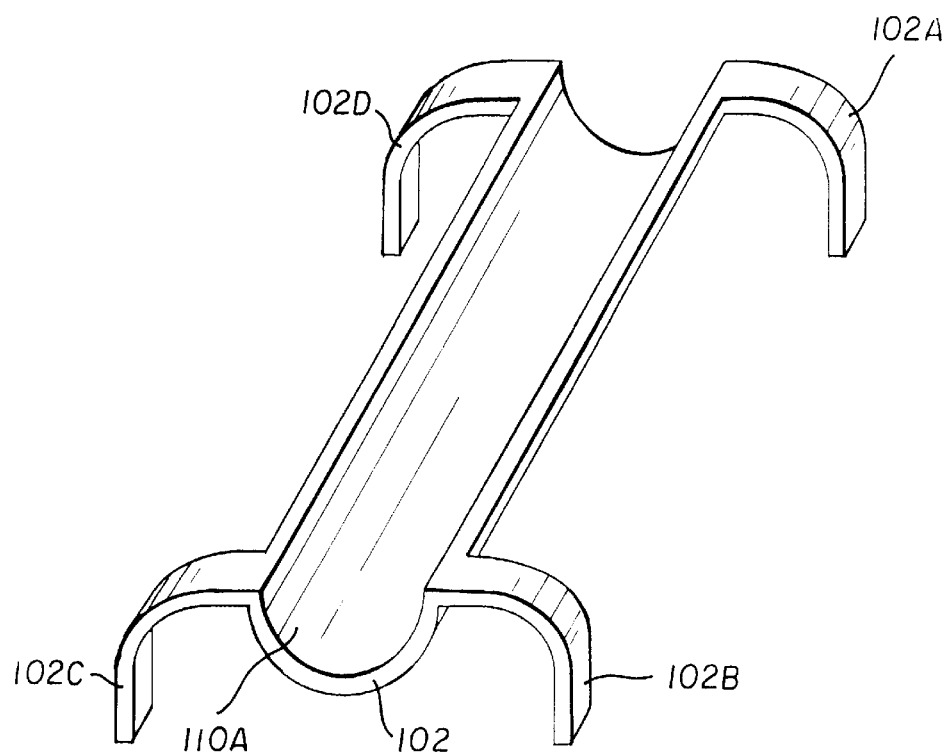
FIG. 8 depicts a third embodiment of a reflector that is usable in the camera flash units of FIGS. 2 and 3.

FIG. 8 illustrates a third embodiment of the reflector 102 that is usable in the camera flash unit 100. As in the previous embodiments, the reflector 102 has a trough with the highly reflective concave inner surface 110A. The walls 110 form this trough and make physical contact with the cylindrical flash lamp tube 120. The reflector 102 of the third embodiment does not have the reflective wings associated with the embodiments 1 and 2. Instead, mounting arms 102A, 102B, 102C, and 102D allow the reflector 102 to be mounted to the flash board 248.

FIGS. 9A, 9B, 10A, 10B and 11A–11E illustrate various ways to position flash lamp tube inside the reflector (of the type illustrated in FIGS. 5, 6 and 8, for example). The following is an explanation of the effect of the depth (of a cylindrically shaped trough) on the optical efficiency of the camera flash unit.

Figure 9A:
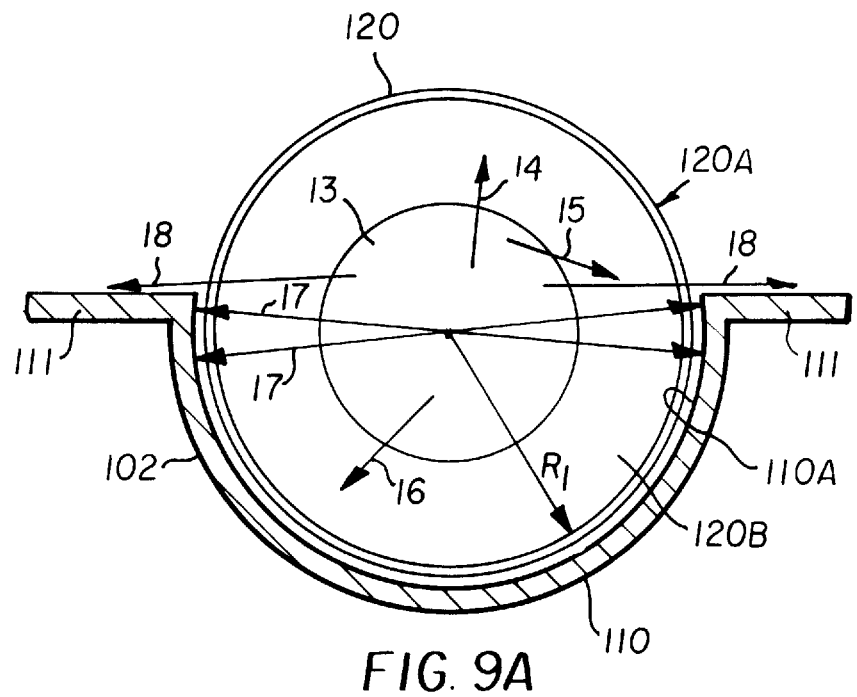
FIG. 9A depicts a cross-sectional view of the camera flash unit in accordance with the present invention, with a "deep" reflector and a cylindrical flash lamp tube situated therein, without the condenser lens element.

FIG. 9A illustrates a cross-section of the flash lamp tube 120 and the reflector 102. The trough of this reflector is deeper than that of an optimal reflector (shown in FIG. 10A) and encompasses more than 180 degrees around the cylindrical flash lamp tube 120. The cylindrical flash lamp tube 120 has the conductive coating 120A applied to the outer surface of the glass wall 120B of the flash lamp tube, along the full length of the flash lamp tube 120. This cylindrical flash lamp tube 120 is adjacent to and makes physical contact with the reflector 102. The inside of the walls 110 has a highly reflective surface 110A and has a radius of curvature substantially the same as the radius of curvature $R_1$ of the cylindrical flash lamp tube 120. The cylindrical flash lamp tube 120 contains gas, such as xenon, that creates plasma 13 when the cylindrical flash lamp tube 120 is discharged. The plasma 13 produces light rays 14, 15, 16 that are emitted from the plasma 13 in a 360 degree solid angle. Most of these rays will be channeled towards the target surface. Some of the light rays, such as rays 17 will be trapped within the flash unit 100. These rays 17 exit the plasma 13, pass through the cylindrical flash lamp tube's glass wall 120B, pass through the conductive coating 120A, impinge and reflect off the reflective surface 110A, pass again through the conductive coating 120A of the flash lamp tube, pass again through the glass wall 120B into the plasma 13 and pass again through the glass wall 120B and the coating 120A to impinge and reflect off the reflective surface 110A. The reflecting off the surface 110A will continue many times, therefore not allowing the light rays 17 to ever escape from the confines of the surface 110A and the flash lamp tube 120. A smaller number of rays 18 will exit the cylindrical flash lamp tube 120 nearly parallel to the reflective wings 111 and will not be directed towards the target surface. This will result in the camera flash unit 100 having less than optimal optical efficiency.

Figure 9B:
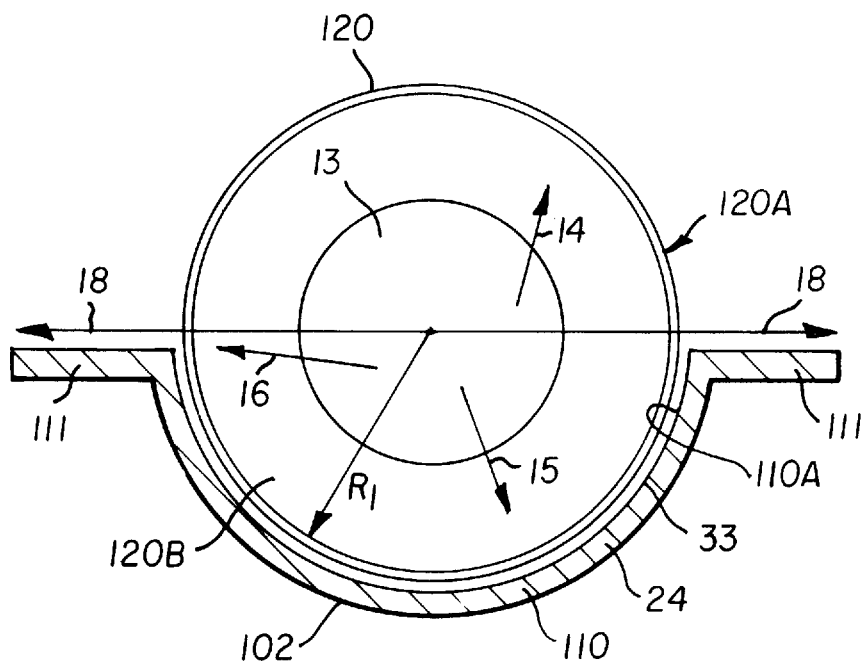
FIG. 9B depicts a cross-sectional view of the camera flash unit in accordance with the present invention, with a "shallow" reflector and a cylindrical flash lamp tube situated therein, without the condenser lens element.

FIG. 9B illustrates a cross-section of the flash lamp tube 120 and the reflector 102. The reflector of FIG. 9B is shallower than the optimal reflector (shown in FIG. 10A) and encompasses less than 180 degrees (about 170 degrees) around the cylindrical flash lamp tube 120. The cylindrical flash lamp tube 120 has the conductive coating 120A on the outer surface of the flash lamp tube glass wall 120B along the full length of the flash lamp tube 120. The cylindrical flash lamp tube 120 shown in FIG. 9B is also adjacent to and makes physical contact with the trough of the reflector 102. The inside of the walls 110 (forming this trough) has a highly reflective surface 110A. This surface 110A has a radius of curvature substantially the same as the radius of curvature $R_1$ of the cylindrical flash lamp tube 120. As stated above, the cylindrical flash lamp tube 120 contains gas, such as xenon, that creates plasma 13 when the cylindrical flash lamp tube 120 is discharged. The plasma 13 produces light rays 14, 15, 16 that are emitted from the plasma 13 in a 360 degree solid angle. Most of these rays will be channeled towards the target surface. None of the light rays will be trapped between the surface 110A and the flash lamp tube 120. A small number of rays 18 will exit the cylindrical flash lamp tube 120 close to and nearly parallel to the reflective wings 111 and will not be directed towards the target surface. The shallower reflector shown in FIG. 9B will give a higher optical efficiency than the deeper reflector shown in FIG. 9A.

Figure 10A:
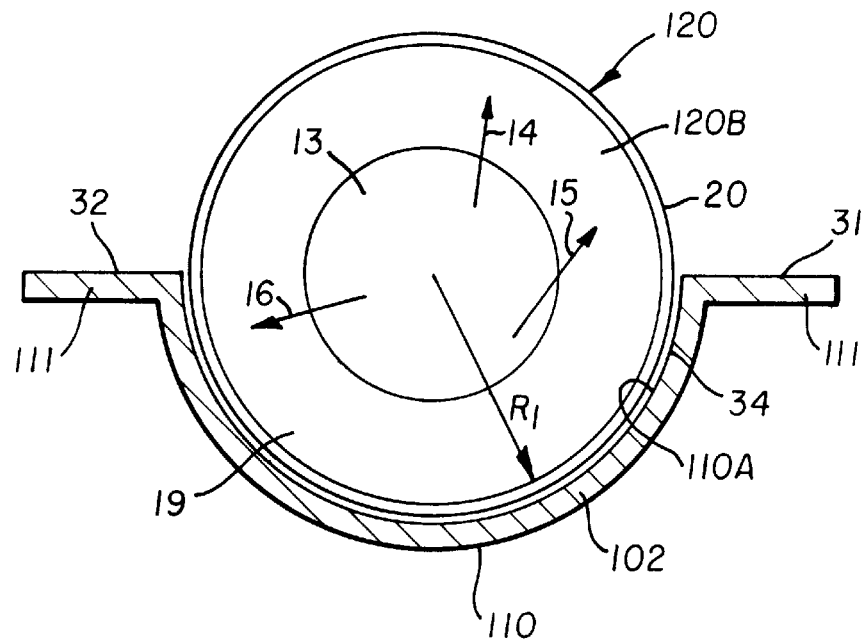
FIG. 10A depicts a cross-sectional view of the camera flash unit in accordance with the present invention, with a reflector of an optimum depth and the cylindrical flash lamp tube situated therein, without the condenser lens element.

FIG. 10A illustrates a cross-section of the cylindrical flash lamp tube 120 and the reflector 102. The trough of the reflector 102 of this embodiment encompasses 179.99 degrees around the cylindrical flash lamp tube 120. The inside of the walls 110 has a highly reflective surface 110A and has a radius of curvature substantially the same as the radius of curvature $R_1$ of the cylindrical flash lamp tube 120. The plasma 13 produces light rays 14, 15, 16 that are emitted from the plasma 13 in a 360 degree solid angle. This reflector allows every light ray 14, 15, 16 to pass through the cylindrical flash lamp tube glass wall 120B and the conductive coating 120A, and either (i) pass directly on to the condenser lens 130, or (ii) reflect off the reflective wings 111 and then be directed towards the condenser lens 130, or (iii) reflect off the surface 110A of the trough, pass through the cylindrical flash tube and then on to the condenser lens 130. This reflector, shown in FIG. 10A, provides the highest optical efficiency.

Figure 10B:
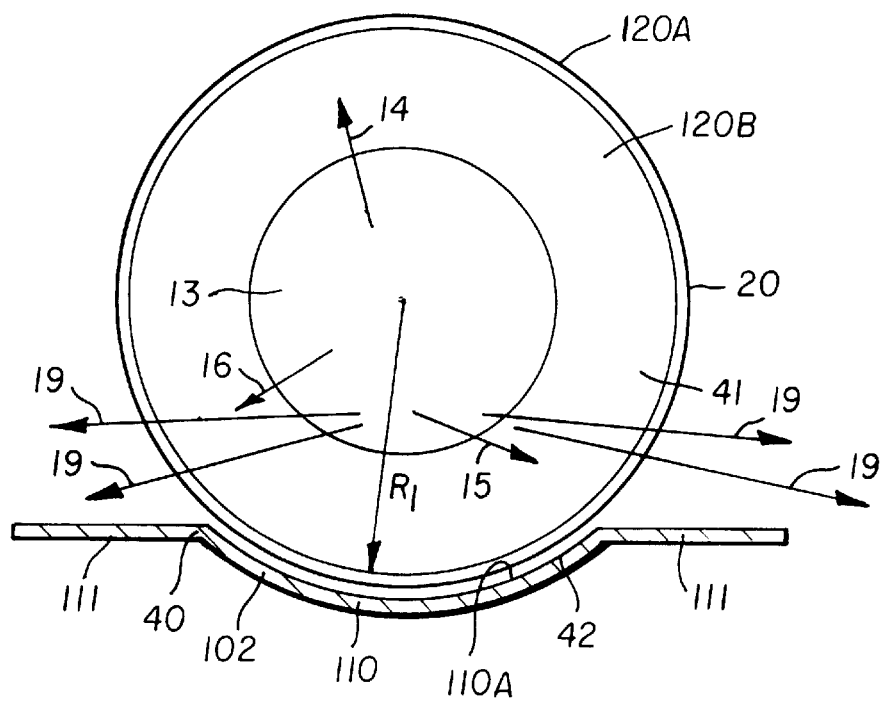
FIG. 10B depicts a cross-sectional view of a camera flash unit in accordance with the present invention, with the "shallowest" reflector and the cylindrical flash lamp tube situated therein, without the condenser lens element.
Figure 11A:
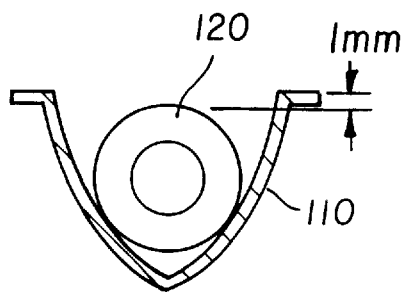
FIGS. 11A–11F depict cross-sectional views of other reflectors.
Figure 11B:
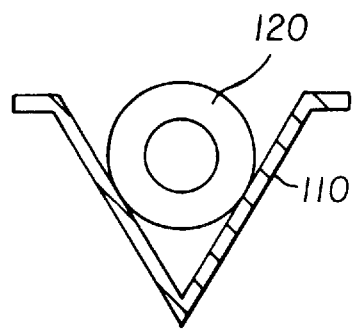
Figure 11C:
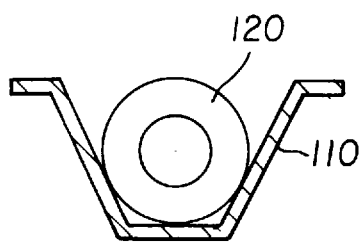
Figure 11D:
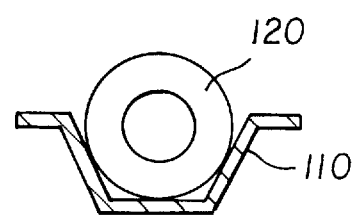
Figure 11E:
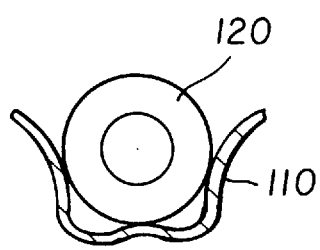
Figure 11F:
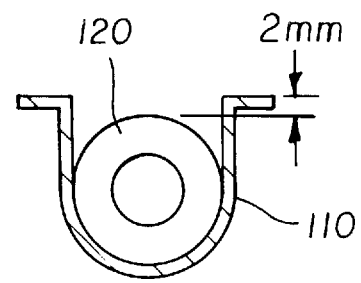

FIG. 10B illustrates a cross-section of the cylindrical flash lamp tube 120 and a very shallow reflector 102. The trough of this reflector 102 encompasses the smallest area possible around the cylindrical flash lamp tube 120, such that the cylindrical flash lamp tube will still have good triggerability. The plasma 13 produces light rays 14, 15, 16 that are emitted from the plasma 13 in a 360 degree solid angle. The reflector 102 allows every light ray to pass through the cylindrical flash lamp tube glass wall 120B, and the conductive coating 120A, and either (i) pass directly on to the condenser lens 130, or (ii) reflect off the reflective wings 111 and then are directed towards the condenser lens 130, or (iii) reflect off the surface walls 110A of the trough, pass through the cylindrical flash lamp tube 120 and then are directed towards the condenser lens 130. This reflector, shown in FIG. 10B, allows the highest percentage of the unreflected light rays to exit the cylindrical flash lamp tube 120 and still maintain good flash triggerability. However, some of the rays 19 will exit the cylindrical flash lamp tube 120 and will not be directed towards the target surface. Although this reflector is similar to the one depicted in FIG. 9B, the trough of the reflector of this embodiment is shallower than the one depicted in FIG. 9B, and therefore the reflector of FIG. 10B is less efficient.

The reflector 102 may have other cross-sectional shapes than the those illustrated in FIGS. 5, 6 and 8. Some of the examples of such cross-sections are illustrated in FIGS. 11A–11F.

Figure 12:
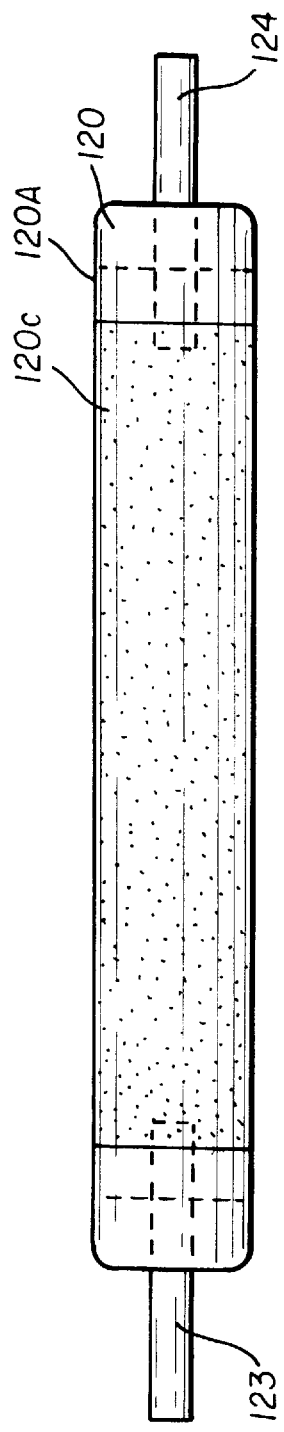
FIG. 12 depicts a side view of an integral flash lamp tube/reflector.
Figure 13:
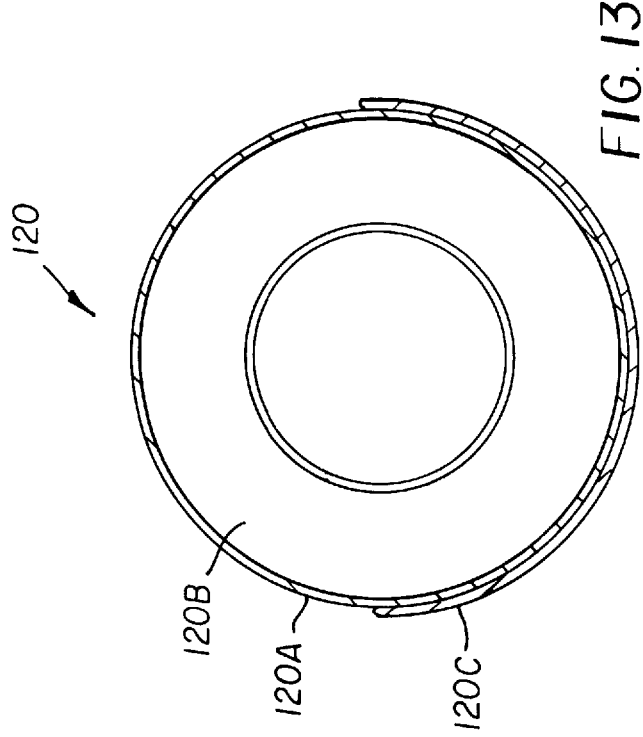
FIG. 13 depicts a cross-sectional view of an integral flash lamp tube/reflector depicted in FIG. 12.

FIGS. 12 and 13 depict an integral flash lamp tube/reflector of yet another embodiment of the present invention.

FIG. 12 is a side view of the integral flash lamp tube/reflector. FIG. 13 is a cross-sectional view of the integral flash lamp tube/reflector shown in the embodiment of FIG. 12. More specifically, these figures show that the integral flash lamp tube/reflector comprises the cylindrical flash lamp tube 120. The cylindrical flash lamp tube 120 has a conductive coating 120A coated 360 degrees around the cylindrical flash lamp tube, on the outside of the flash lamp tube wall 120B. The conductive coating 120A extends along the length of the cylindrical flash lamp tube covering a distance from approximately one half of the internal portion of the anode 123 (i.e., a portion that is contained within the cylindrical flash lamp tube 120) to approximately one half of the internal portion of the cathode 124. The reflector of this embodiment is not a separate reflector. Instead a large section of the conductive coating 120A is coated with a highly reflective material (such as aluminum or silver) 120C. The highly reflective coating 120C encompasses approximately 180 degrees around the outside of the conductive coating 120A and extends along the length of the cylindrical flash lamp tube, covering a section of the anode 123 (that is contained within the cylindrical flash lamp tube) and a section of the cathode 124 (that is also contained within the cylindrical flash lamp tube). It is also possible to apply a metallic reflective coating directly on the surface of the cylindrical flash lamp tube. This would eliminate the need for the conductive coating. The highly reflective coating 120C extends for less than the length of the conductive coating 120A.

Figure 1:
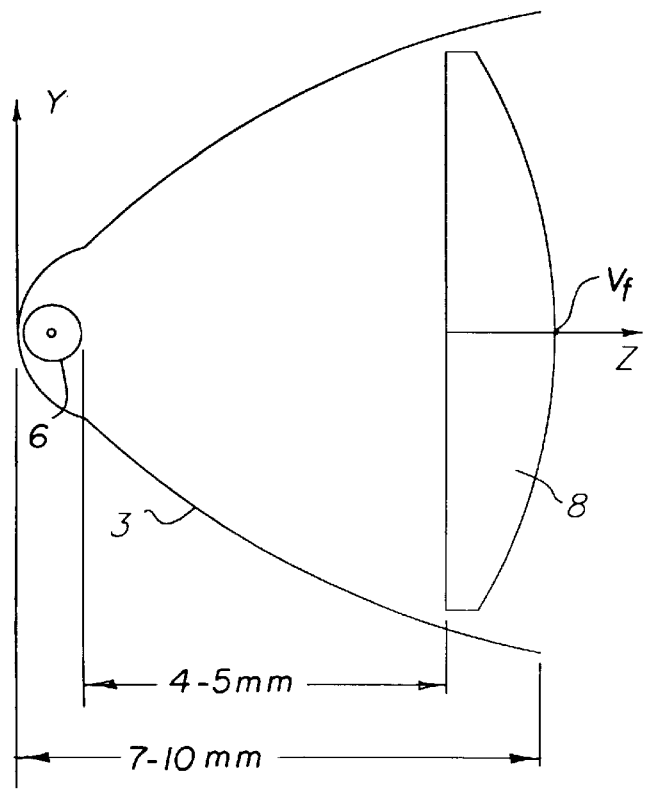
FIG. 1 shows a prior art camera flash unit.
Figure 14B:
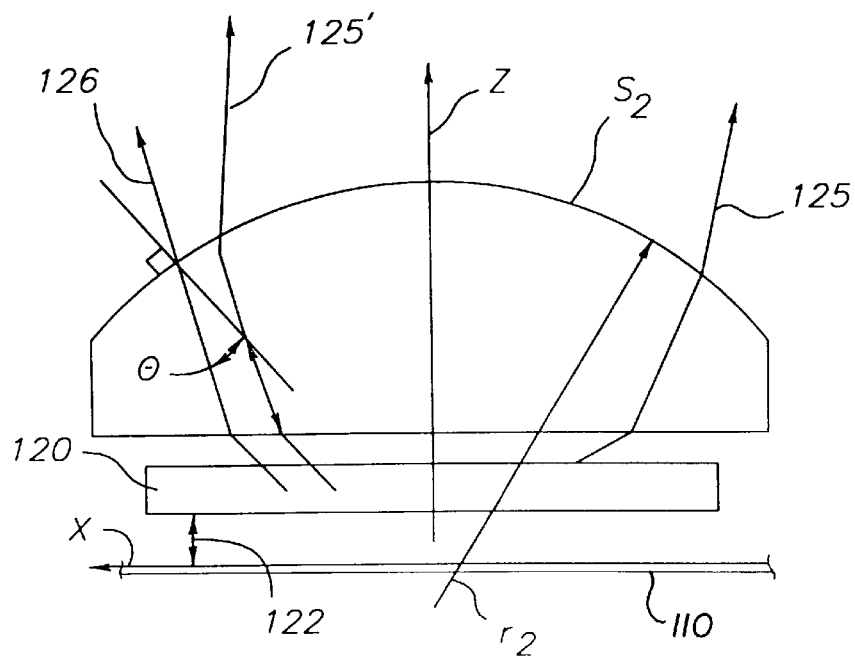
FIGS. 14A and 14B are schematic cross-sectional views of a camera flash unit incorporating a condenser lens element with a toroidal surface.
Figure 14A:
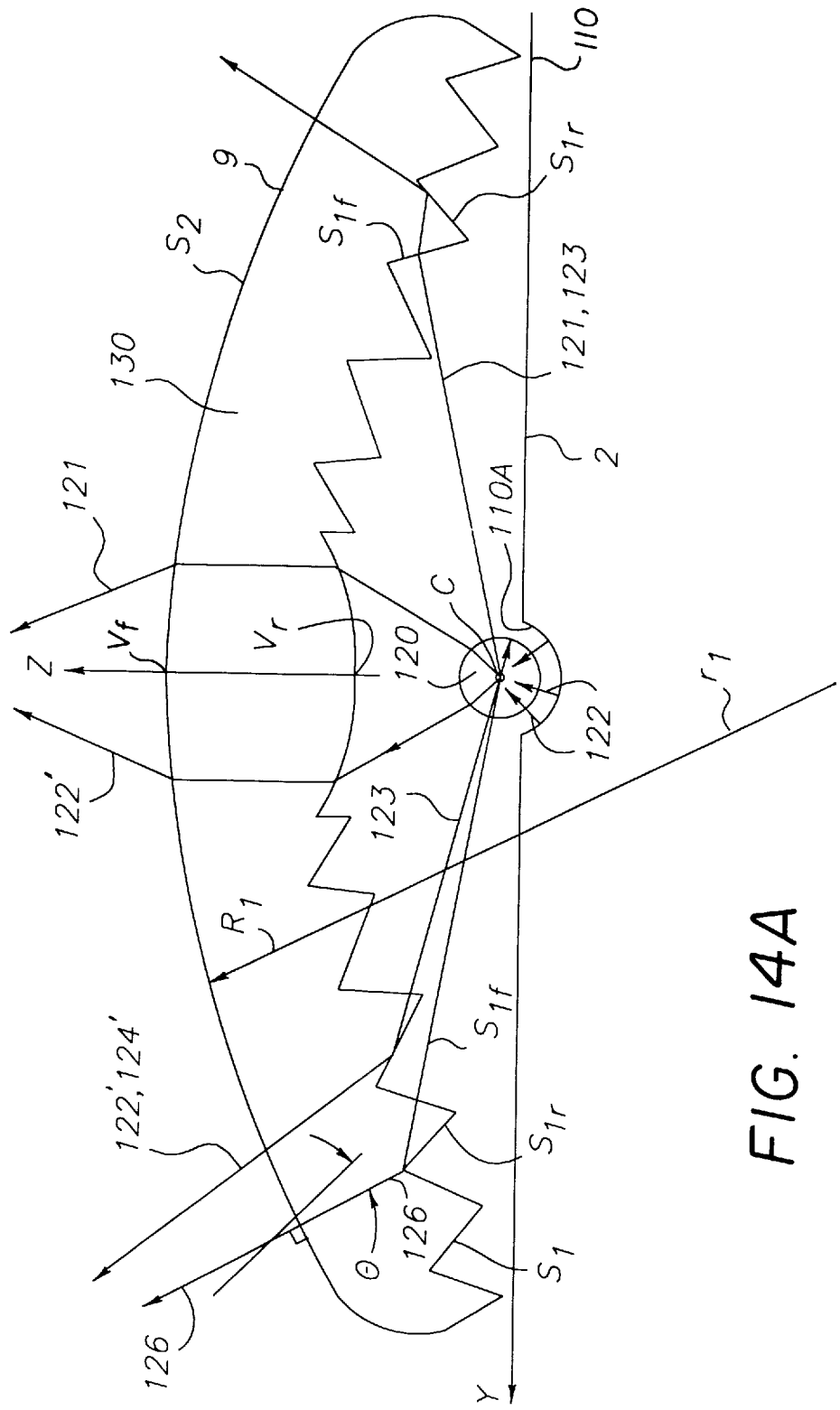

FIGS. 2, 3 and 14A–14B show a cross-section of a camera flash unit 100 including the reflector 102 with the trough, the flash lamp tube 120 and the condenser lens element 130. The condenser lens element 130 is a singlet. Although a condenser lens element with refractive surfaces may be used in a camera flash unit 100, it is preferred that the back surface, $S_1$, of the condenser lens element 130 be a hybrid refractive/Total Internal Reflection (TIR) surface. The hybrid refractive/TIR surface is a surface that both refracts and totally internally reflects incident light rays. The phenomenon of the Total Internal Reflection is known and is described, for example, on pages 81–85 of the book "Optics" by Eugene Hecht and Alfred Zajak. The hybrid refractive/TIR surface $S_1$ provides optical power in only one direction (in Y-Z plane). This surface $S_1$ has a faceted surface profile that first refracts the incident light rays and then reflects the refracted light rays using total internal reflection, towards a front surface (surface $S_2$) as discussed below. (This surface $S_1$ is described in detail in the above mentioned related application). This feature allows the back surface $S_1$ to be situated close to the flash lamp tube 120, so that the center distance d between the flash lamp tube 120 and the surface $S_2$ is smaller than 2 mm. It is preferred that this distance be smaller than 1 mm. More specifically, FIG. 14A illustrates the behavior of the light rays emanating from the camera flash unit 100 of the first embodiment. This figure shows in the Y-Z plane (side view) the light rays traveling from the flash lamp tube towards the reflective inner surface walls, reflecting off these walls and propagating through the condenser lens element 130. It shows that both the direct rays 121 and the reflected rays 122' are incident on the condenser lens element 130. These rays first encounter the back surface $S_1$ of the condenser lens element 130. As stated above, surface $S_1$ is a hybrid refractive/TIR surface. Substantially all of the light rays (rays 123') incident on this surface $S_1$ are first transmitted through the front surface $S_{1f}$ of its facets, and then totally internally reflected as light rays 124' by the rear surface $S_{1r}$ of its facets (FIG. 14A). The totally internally reflected light rays 124' are directed towards the front surface $S_2$ which directs the light rays 124' towards the target surface 25 (not shown).

The front side surface (surface $S_2$) of the embodiment illustrated in FIG. 2 is cylindrical (i.e., it has optical power in only one plane). However, it is preferred that the front side surface (surface $S_2$) of the condenser lens element be toroidal as illustrated in FIGS. 14A and 14B. That is, the front side surface of the condenser lens element 130 is not a rotationally symmetrical surface, it has different radii of curvature $r_1$ and $r_2$ in the X-Z and Y-Z planes, as shown in FIG. 14A, 14B, and thus, it provides different amounts of optical power in the X-Z and Y-Z planes. Because the front surface $S_2$ provides optical power in the X-Z plane, it refracts the non-perpendicular rays 125' emanating from the linear flash lamp tube 120 towards the intended target surface.

Furthermore, because the front surface $S_2$ of the condenser lens element 130 is toroidal (i.e., it has different optical power in X-Z and Y-Z planes), the surface $S_2$ of the condenser lens element 130 can independently control the illumination in at least two directions transverse to the optical axis Z of the condenser lens element. This results in a good light distribution at the target surface 25 located 5–8 feet away from flash unit 100. However, it is contemplated that the front surface $S_2$ does not have to be toroidal as long as it provides optical power in the X-Z plane.

The specific parameters for the refractive/TIR condenser lens element of the first embodiment 130 are provided in Tables 1A and 1B.

TABLE 1A

| Surface | Y Radius | X Radius | Thickness | Index |
|---|---|---|---|---|
| $S_1$ | TIR surface | | 4 mm | 1.58 |
| $S_2$ | −50 mm | −10 mm | | |

The specific parameters for the TIR surface are provided in Table 1B where the TIR surface is defined by 37 different points. The coordinates (Y and Z) of these points are provided below in Table 1B.

TABLE 1B

TIR Surface/Surface $S_1$
(Dimensions in cm)

| Point location | (Z) | (Y) |
|---|---|---|
| 1 | 0 | 0 |
| 2 | 0.005 | 0.02 |
| 3 | 0.01 | 0.04 |
| 4 | 0.015 | 0.06 |
| 5 | 0.02 | 0.08 |
| 6 | 0.03 | 0.1 |
| 7 | 0.04 | 0.12 |
| 8 | 0.05 | 0.14 |
| 9 | 0.065 | 0.16 |
| 10 | 0.08 | 0.18 |
| 11 | 0.1 | 0.2 |
| 12 | 0.11 | 0.22 |
| 13 | 0.12 | 0.24 |
| 14 | 0.12 | 0.26 |
| 15 | 0.124 | 0.295 |
| 16 | 0.093 | 0.3 |
| 17 | 0.165 | 0.369 |
| 18 | 0.080 | 0.37 |
| 19 | 0.164 | 0.442 |
| 20 | 0.069 | 0.442 |
| 21 | 0.15 | 0.512 |
| 22 | 0.051 | 0.513 |
| 23 | 0.12 | 0.588 |
| 24 | 0.030 | 0.59 |
| 25 | 0.089 | 0.671 |
| 26 | 0.009 | 0.672 |
| 27 | 0.071 | 0.748 |
| 28 | −0.016 | 0.75 |
| 29 | 0.045 | 0.834 |
| 30 | −0.045 | 0.835 |
| 31 | 0.018 | 0.920 |
| 32 | −0.077 | 0.921 |
| 33 | −0.014 | 1.012 |
| 34 | −0.114 | 1.012 |
| 35 | −0.047 | 1.096 |
| 36 | −0.156 | 1.1 |
| 37 | −0.082 | 1.166 |

It is contemplated that the front surface $S_2$ may be either spherical or cylindrical or toroidal may also be aspherical and defined by a standard aspheric equation (see equations 1 and 2) and by a conic constant and/or higher order aspheric coefficients. This would further facilitate illumination control of the target surface 25 by fine tuning the direction of the light rays exiting surface $S_2$ of the condenser lens element 130.

$$Z(Y) = \frac{C_1 Y^2}{1 + \sqrt{1 - (K+1)C_1^2 Y^2}} + \\ ADY^4 + AEY^6 + AFY^8 + AGY^{10} + AHY^{12} + AIY^{14} + AJY^{16} + AKY^{18}; \quad (eq.1)$$

$$Z(X) = \frac{C_2 X^2}{1 + \sqrt{1 - (K+1)C_2^2 X^2}} + \\ ADX^4 + AEX^6 + AFX^8 + AGX^{10} + AHX^{12} + AIX^{14} + AJX^{16} + AKX^{18} \quad (eq.2)$$

where:
Z is the distance along the optical axis of the condenser lens element;
Y is the height from the optical axis along the Y axis;
X is the height from the optical axis along the X axis;
$C_1$, $C_2$ are the reciprocals of the vertex radii ($r_1$, $r_2$) of curvature of the condenser lens element; surface;
K is the conic coefficient; and
AD through AK are aspheric coefficients of 4th, 6th, 8th, 10th, 12th, 14th, 16th, and 18th order.

Figure 15A:
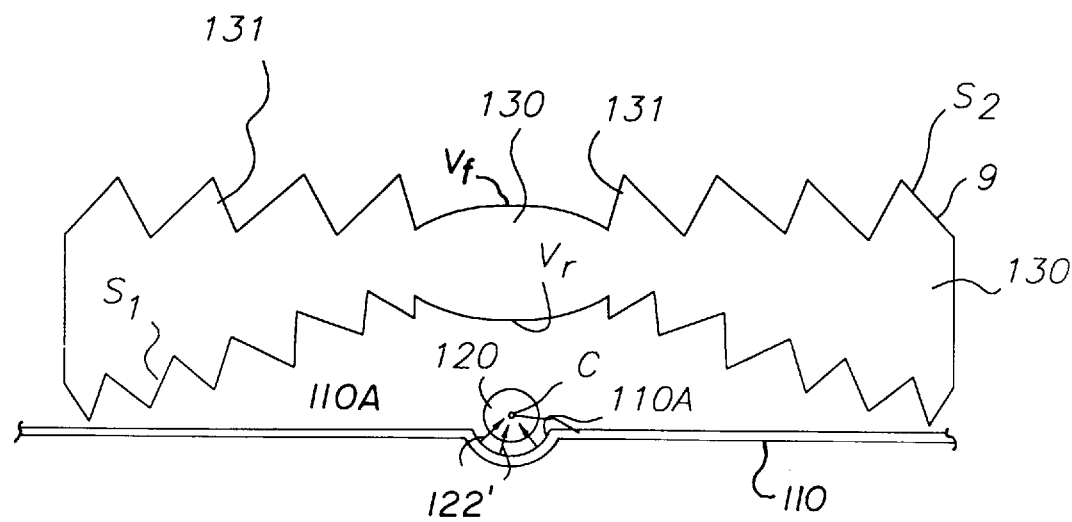
FIGS. 15A and 15B are schematic cross-sectional views of a camera flash unit with a different condenser lens element.
Figure 15B:
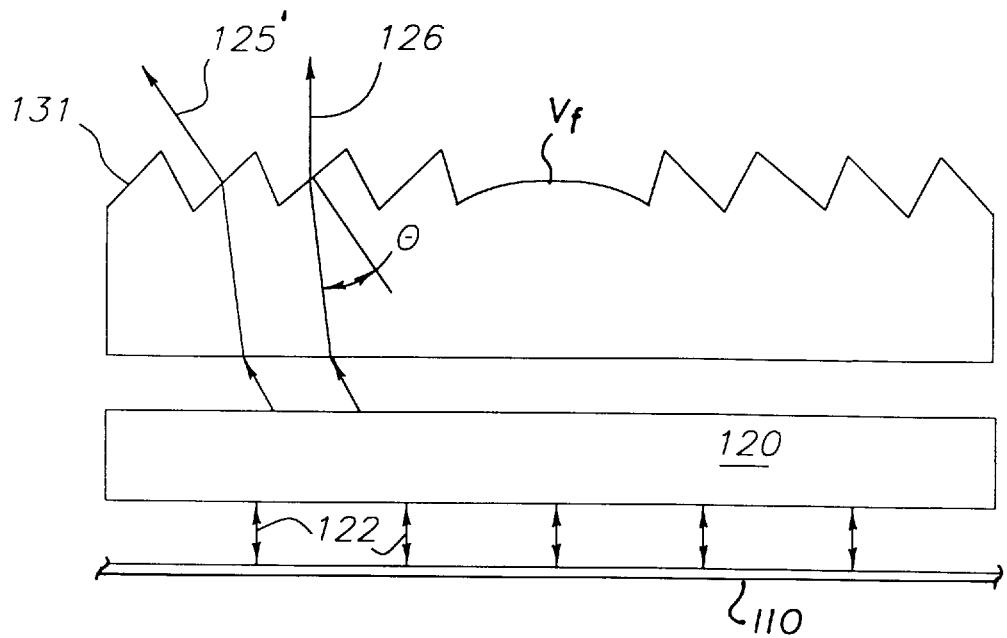

FIGS. 3, 15A and 15B illustrate a second example of the condenser lens element 130 that provides an even more compact flash unit than that of the first example. In the second embodiment, the refractive/TIR condenser lens element 130 has a front side surface $S_2$ with Fresnel lens facets 131 providing optical power in at least the cross-section that is orthogonal to the surface cross-section of surface $S_1$ providing optical power to the surface $S_1$ (FIG. 15B). In general, the Fresnel lens facets of the front surface may be located in any number of orientations on the front side surface $S_2$ of the refractive/TIR condenser lens element. Preferably, the Fresnel facets 131 form ridges 132 (FIGS. 15A, 15B) having an elliptical shape. However, for manufacturing ease, the Fresnel facets 131 would form ridges 132 having circular symmetric shapes. The Fresnel facets 131 help to reduce the average angles-of-incidence θ of the out-of-plane light rays 126 as they encounter the front surface $S_2$, thereby reducing reflection losses to bring about a greater concentration of radiant energy in the target surface 25.

The specific parameters for the refractive/TIR condenser lens element 130 of the second embodiment are provided in Tables 2A and 2B. It is noted that the back surface $S_1$ of the condenser lens element 130 of the second embodiment is the same to that of surface $S_1$ of the first embodiment and that the surface $S_2$ (described in the Table 2B) is

TABLE 2A

TIR SURFACE OF LENS ELEMENT 130
(Dimensions in cm)

| Point | Sag at Radial Coordinate (Z) | Coordinate (Y) |
|---|---|---|
| 1 | 0 | 0 |
| 2 | 0.005 | 0.02 |
| 3 | 0.01 | 0.04 |
| 4 | 0.015 | 0.06 |
| 5 | 0.02 | 0.08 |
| 6 | 0.03 | 0.1 |
| 7 | 0.04 | 0.12 |
| 8 | 0.05 | 0.14 |
| 9 | 0.065 | 0.16 |
| 10 | 0.08 | 0.18 |
| 11 | 0.1 | 0.2 |
| 12 | 0.11 | 0.22 |
| 13 | 0.12 | 0.24 |
| 14 | 0.12 | 0.26 |
| 15 | 0.124 | 0.295 |
| 16 | 0.093 | 0.3 |
| 17 | 0.165 | 0.369 |
| 18 | 0.080 | 0.37 |
| 19 | 0.164 | 0.442 |
| 20 | 0.069 | 0.442 |
| 21 | 0.15 | 0.512 |
| 22 | 0.051 | 0.513 |
| 23 | 0.12 | 0.588 |
| 24 | 0.030 | 0.59 |
| 25 | 0.089 | 0.671 |
| 26 | 0.009 | 0.672 |
| 27 | 0.071 | 0.748 |
| 28 | −0.016 | 0.75 |
| 29 | 0.045 | 0.834 |
| 30 | −0.045 | 0.835 |
| 31 | 0.018 | 0.920 |
| 32 | −0.077 | 0.921 |
| 33 | −0.014 | 1.012 |
| 34 | −0.114 | 1.012 |
| 35 | −0.047 | 1.096 |
| 36 | −0.156 | 1.1 |
| 37 | −0.082 | 1.166 |

TABLE 2B

FRESNEL SURFACE OF LENS ELEMENT 130
(Dimensions in cm)
Radial Profile Coordinates
Second Surface of Lens Element

| | Sag at Radial Coordinate Z | Radial Coordinate Y |
|---|---|---|
| 1 | 0 | 0 |
| 2 | −0.1 | 0.3 |
| 3 | 0 | 0.3 |
| 4 | −0.1 | 0.5 |
| 5 | 0 | 0.5 |
| 6 | −0.1 | 0.65 |
| 7 | 0 | 0.65 |
| 8 | −0.1 | 0.75 |
| 9 | 0 | 0.75 |
| 10 | −0.1 | 0.825 |
| 11 | 0 | 0.825 |
| 12 | −0.1 | 0.9 |
| 13 | −0.1 | 1.15 |

Thickness = 2 mm

The back surface $S_1$ of the refractive/TIR condenser lens element 130 begins 0.8 mm in front of the flash lamp's surface. The refractive/TIR condenser lens element 130 has a refractive index of 1.58. The refractive/TIR condenser lens element 130 is approximately 18 mm wide by 23 mm high.

Cylindrical flash lamp sources, such as xenon flash lamp tubes, are available commercially. A flash lamp tube appropriate for a camera flash unit has an outside radius of curvature between 1 and 3 millimeters. The glass portions of these cylindrical flash lamp tubes are approximately 7 to 25 millimeters long. For purposes of compactness it is preferred that the cylindrical flash lamp tubes be 7 to 18 millimeter long. As stated earlier, behind and adjacent to the cylindrical flash lamp tube 120 is the reflector 102. It is preferred that the reflective surface 110A of the reflector 102 does not extend more than 2 millimeters beyond the flash lamp tube 120 towards the condenser lens element. It is even more preferred that it extends no more than 1 millimeter towards the condenser lens element. The total distance d measured from the front vertex $V_f$ of the lens element 130 to the back surface of the trough (of the reflector 102) is less than approximately 7 millimeters and is preferably in a 2 to 6 mm range. It is most preferred that it be 3 to 5 millimeters long. It is also preferred that the reflective surface 110A of this reflector be concave and essentially concentric with the flash lamp tube's back wall (i.e., the reflector facing wall). It is preferred that the reflectivity of the surface 110A reflectivity be at least 80%. It is also preferred that this reflective surface 110A have a radius of curvature that is in the range of 1 to 3 millimeters. As can be seen from FIGS. 2 and 3, the trough's shape closely tracks the shape of the flash lamp tube 120. This arrangement allows the reflected light rays 122' to be directed toward the center C (FIGS. 14A and 14B) of the flash lamp tube and mitigates shadowing effects caused by the flash lamp tube. The flash lamp tube 120 nearly touches the condenser lens element 130. The center C of the flash lamp tube 120 is located about 1 millimeter away from the rear vertex $V_r$ of the condenser lens element 130. The actual distance is determined by the diameter of the flash lamp tube and by the base curvature of the back surface $S_1$ of the condenser lens element 130. The length of the trough should be approximately 7 to 25 millimeters, and preferably between 7 and 18 millimeters.

As stated above, at either end of the trough (of the reflector 102) are reflective wings 111. They also have a reflectivity of at least 80%.

The additional specific parameters for the flash lamp tube described above are as follows:

According to a preferred embodiment, the flash lamp tube 120 delivers approximately 5.5 joules of radiant energy per flash. This radiant energy is visible, near UV (ultra violet) and near IR (infra-red) light. The example illustrated in FIGS. 2, and 3, utilizes a xenon flash lamp tube.

This flash lamp tube is modeled as a Lambertian cylindrical source with the length of 12.5 mm, an inside diameter of 0.7 mm and an outside diameter of 1.5 mm. The plasma or source illumination fills the inside diameter of the flash lamp tube. The refractive index of the cylindrical walls of the modeled flash lamp tube is 1.46.

Camera Flash Unit Performance

As discussed above, the introduction of power in the orthogonal direction (to that provided by the surface $S_1$) by the front surface $S_2$ of the condenser lens element, as exemplified by the first and second embodiments, redirects the light rays 125' which are not perpendicular to the axis of symmetry X of the linear flash lamp tube towards the intended target surface (FIGS. 14B, 15B).

Figure 16:
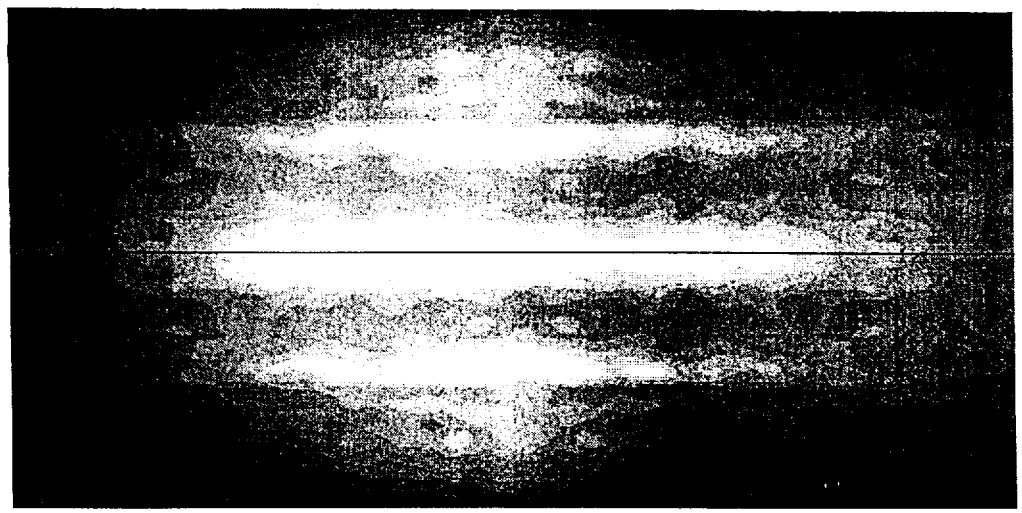
FIGS. 16 and 17 are plots of the intensity distribution at a target surface. The target surface is parallel to the X-Y plane (where X is the horizontal direction and Y is the vertical direction) of the camera flash unit and is at a separation of 7.5 feet from the camera flash unit.
Figure 17:
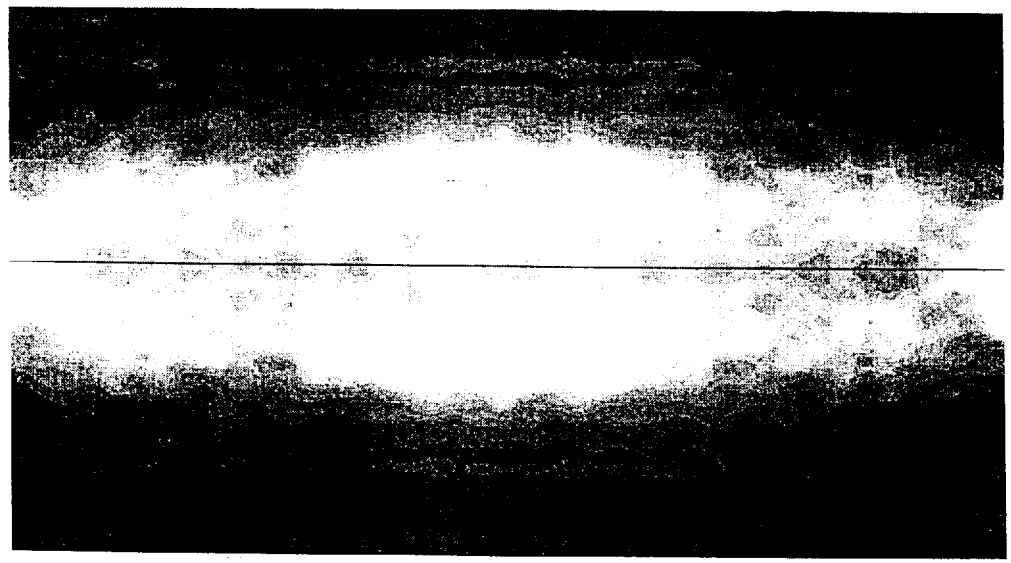

This gives the advantage of greater concentration of radiant energy on the target surface 25. The camera flash unit of the preferred embodiments described herein achieves a good illumination on the target surface 25 of approximately 275 cm×160 cm (width and height) located about 230 cm away from the refractive/TIR condenser element 130. Tables 3 and 4 provide relative illumination intensities on the target 25 for the first and second embodiments, respectively and correspond to FIGS. 16 and 17. FIG. 16 corresponds to Table 3 and is a plot of the intensity distribution in the Y-X plane for the camera flash unit utilizing the refractive/TIR condenser lens element with the Fresnel front surface $S_2$. FIG. 17 corresponds to Table 4 and is a plot of the intensity distribution in the Y-X plane for the flash unit 100 utilizing a refractive/TIR condenser lens element with the toroidal front surface. The intensity distributions are normalized, with the intensity having a value of 100 at the center of the target surface 25.

TABLE 3

| 41 | 47 | 48 | 49  | 51  | 51  | 43  | 51  | 51  | 49  | 48 | 46 | 41 |
|----|----|----|-----|-----|-----|-----|-----|-----|-----|----|----|----|
| 37 | 47 | 43 | 42  | 45  | 42  | 45  | 44  | 46  | 41  | 42 | 49 | 38 |
| 44 | 46 | 53 | 53  | 59  | 64  | 64  | 64  | 61  | 54  | 53 | 45 | 43 |
| 62 | 77 | 71 | 76  | 85  | 99  | 96  | 98  | 85  | 76  | 70 | 77 | 65 |
| 77 | 95 | 96 | 100 | 106 | 116 | 112 | 115 | 107 | 101 | 96 | 94 | 78 |
| 92 | 90 | 93 | 96  | 96  | 95  | 100 | 97  | 96  | 97  | 95 | 90 | 91 |
| 93 | 88 | 92 | 97  | 96  | 95  | 100 | 97  | 96  | 97  | 93 | 88 | 92 |
| 77 | 95 | 96 | 100 | 106 | 115 | 113 | 114 | 107 | 100 | 96 | 94 | 79 |
| 64 | 78 | 72 | 78  | 88  | 101 | 97  | 100 | 87  | 77  | 71 | 77 | 66 |
| 43 | 46 | 53 | 56  | 58  | 64  | 65  | 64  | 60  | 56  | 53 | 46 | 43 |
| 38 | 47 | 45 | 42  | 47  | 44  | 46  | 45  | 48  | 42  | 44 | 48 | 35 |
| 40 | 46 | 47 | 50  | 50  | 49  | 42  | 49  | 49  | 50  | 47 | 45 | 41 |

TABLE 4

| 45.1  | 52.1  | 53.2  | 54.6  | 57.0  | 56.1  | 47.2  | 56.4  | 56.2  | 54.8  | 53.6  | 50.6  | 46.0  |
|-------|-------|-------|-------|-------|-------|-------|-------|-------|-------|-------|-------|-------|
| 41.3  | 52.2  | 47.8  | 46.4  | 50.2  | 47.0  | 50.3  | 48.3  | 51.0  | 45.9  | 47.0  | 54.0  | 42.1  |
| 48.3  | 50.7  | 58.6  | 59.2  | 65.7  | 71.4  | 70.7  | 71.0  | 68.0  | 59.8  | 58.4  | 50.3  | 48.2  |
| 68.9  | 85.9  | 78.8  | 84.4  | 94.5  | 109.5 | 106.6 | 108.4 | 94.3  | 84.1  | 77.8  | 85.1  | 71.8  |
| 85.1  | 105.3 | 106.9 | 111.3 | 117.8 | 128.4 | 123.9 | 127.8 | 118.9 | 111.9 | 106.3 | 104.6 | 86.4  |
| 102.6 | 100.2 | 103.5 | 107.1 | 106.8 | 105.1 | 111.0 | 107.4 | 106.7 | 107.6 | 105.1 | 99.9  | 100.6 |
| 103.7 | 98.2  | 102.1 | 107.6 | 106.5 | 105.6 | 111.1 | 107.8 | 106.4 | 107.9 | 103.7 | 97.9  | 102.1 |
| 85.9  | 105.3 | 107.1 | 111.1 | 117.6 | 127.8 | 125.5 | 127.0 | 118.9 | 111.5 | 106.4 | 104.5 | 87.4  |
| 70.8  | 86.7  | 79.6  | 86.2  | 97.3  | 111.9 | 108.0 | 110.5 | 97.0  | 85.6  | 78.9  | 85.6  | 73.3  |
| 47.7  | 51.1  | 59.1  | 61.8  | 64.7  | 71.0  | 71.9  | 71.1  | 67.0  | 62.4  | 59.2  | 50.7  | 47.5  |
| 42.0  | 52.0  | 49.4  | 46.8  | 52.1  | 49.1  | 51.0  | 50.5  | 52.9  | 46.4  | 48.7  | 53.7  | 42.6  |
| 44.8  | 51.5  | 52.1  | 55.3  | 55.2  | 54.7  | 46.6  | 54.9  | 54.4  | 55.0  | 52.3  | 50.3  | 45.5  |

The previously described camera flash unit 100 having the above-described condenser lens element 130 is operationally connected to a capacitor 246, is mounted on the circuit board 248 and is powered by a battery 250. The circuit board includes circuit elements necessary to develop a charge and to activate the flash lamp tube. The circuit board can include flash synchronization contacts for releasing the energy required by the flash lamp tube.

Camera Assembly

Figure 18:
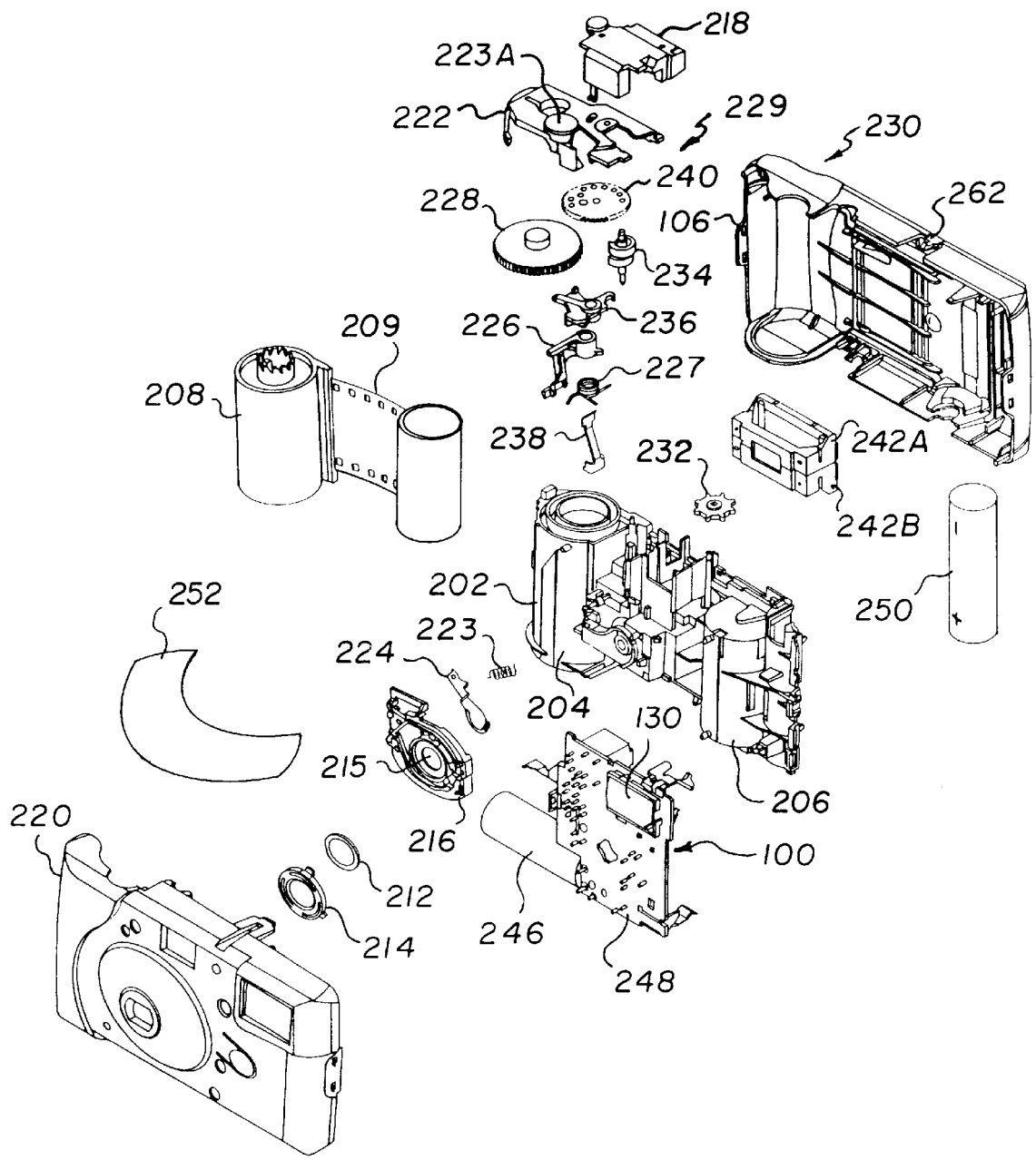
FIG. 18 illustrates an exploded view of a camera incorporating the camera flash unit of FIGS. 2 or 3.

Referring now to FIG. 18, the camera flash unit 100 can be contained within the assemblage of a camera, such as a recyclable single use camera 200 having a body assembly with three major structural components; a body or frame 202, a front cover 220 which is attached to the front of the body 202, and a rear cover 230 which is attached to the rear of the body 202.

Figure 20:
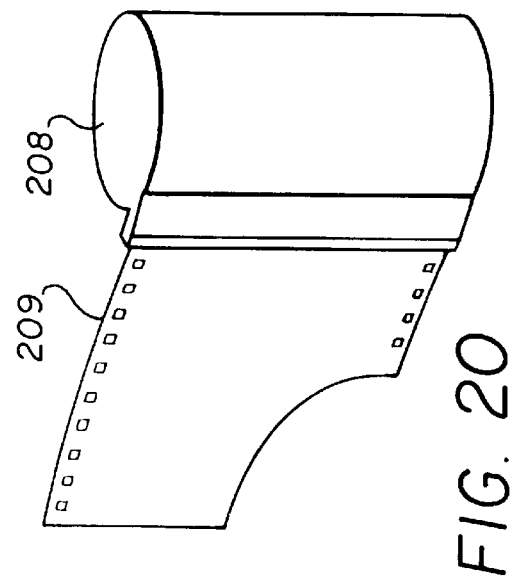
FIG. 20 is a perspective view of a film cassette suitable for use in the camera of FIG. 19.

Referring more specifically to the exploded view of the camera 200 shown in FIG. 18, the body 202 includes a pair of film chambers 204, 206 (i.e., a cartridge chamber 204 and a film chamber 206) for retaining a film cassette 208 (FIG. 20) and a roll of unexposed film, respectively. An exposure gate 207 is disposed between the film chambers 204, 206. The body 202 (see FIG. 18) additionally supports the following camera parts which are attached to the body prior to the attachment of the covers 220, 230: a taking lens 212 which is attached to the front of the body 202 by means of a two piece holder 214, 216 and a viewfinder 218. Also, attached to the body 202 is a shutter mechanism 219 consisting of a release 222 having a depressible button 223A for tripping a shutter blade 224. The shutter blade 224 is held in place over an aperture 215 by a holder 216. The shutter blade 224 is movable between an open position and a closed position and is biased toward the closed position by a helical spring 223. A high energy lever 226 is mounted in the body between the release 222 and the shutter blade 224. The high energy movable lever 226 is movable from a release position to a set position by a film advancing and metering mechanism 229. The high energy lever 226 is biased toward the released position by a spring 227. The high energy lever 226 is held in the set position by a film advancing and metering mechanism 229 until a shutter release button 223A is pressed, at which time the high energy lever 226 is driven by the spring 227 against the shutter blade moving the shutter blade from the closed position to the open position. The high energy lever 226 then moves past the shutter blade and the shutter blade returns to the closed position under the action of the spring 223. The high energy lever is reset for the next film exposure by the film advancing and metering mechanism.

The film advancing and metering mechanism 229 includes mechanically coupled components which advance and meter the film. A thumbwheel 228 engages the spool (not shown) of the loaded film cassette 208. A sprocket 232 engages film perforations and has a spring biased portion extending into a rotatable cam 234 which engages a metering lever 236, biased by means of a spring 238, so as to enable frame by frame film advance. The cam 234 has an extending portion that drives a frame counter 240.

Figure 19:
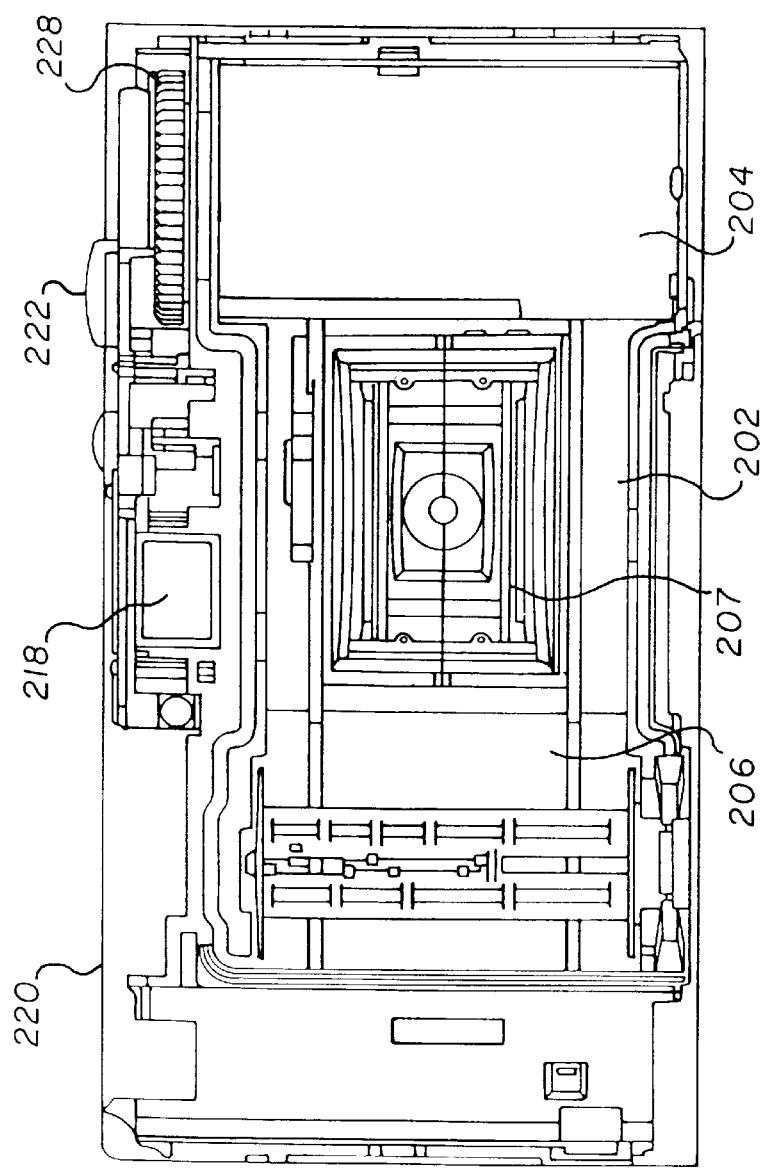
FIG. 19 is a rear plane view of the camera of FIG. 18 with a rear cover removed.

The body assembly 201 also includes a light baffle 242, (made of an upper baffle part 242A and lower baffle part 242B) which are mounted into the rear of the body 202 interior to exposure gate 207 (FIG. 19), or alternatively are integrally formed with the body 202.

The front cover 220 and the rear cover 230 are sandwiched and held together along with the body 202 by hooks and matching slots, or tabs, or heat, or solvent welding, or the like, to form an assembled camera. One or more decorative labels 252 may be subsequently attached to the finished camera to provide a convenient place for product identification and operational information. The label or labels may take the form of a sticker or a folded cardboard element.

For a variety of reasons, including economic efficiency and environmental concerns, single use cameras, such as the described camera 200, are designed to be recycled by the manufacturer after a purchaser has completed exposing the loaded film and turned the camera over to a photofinisher for development of the film. See, for instance, U.S. Pat. No. 5,329,330 to Sakai, et al. Therefore, certain parts of the cameras are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicate the number of times it has been reconstructed. A mark or reuse indicator 211 may be placed on a circuit board 248 as shown in FIG. 4 to be used in indicating the number of times the board 268 has been recycled.

Figure 21:
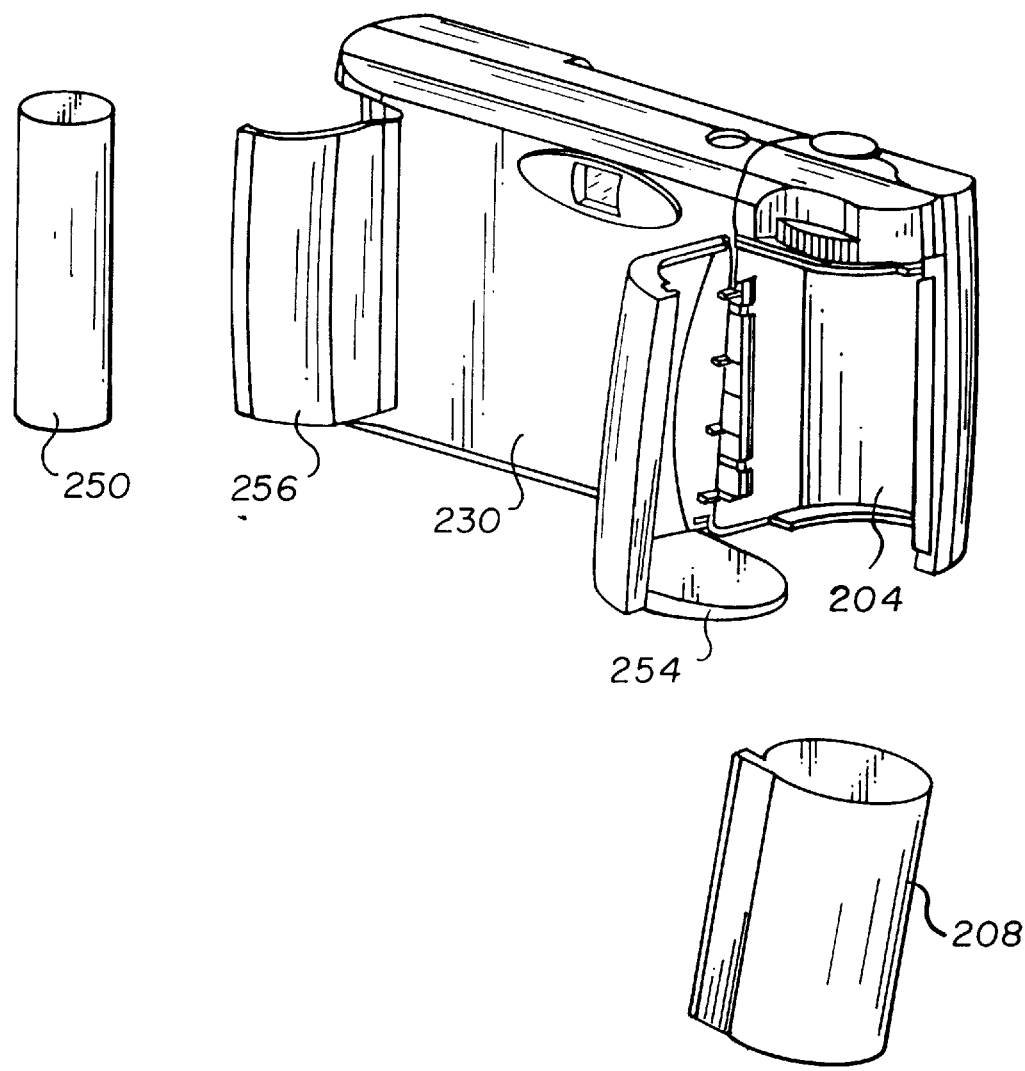
FIG. 21 is a partially exploded rear perspective view of the camera shown in FIGS. 18 and 19.

An efficient recycling program requires a number of competing concerns to be reconciled. In general, the manufacturer/recycler wants to facilitate easy access to the exposed film when removed by the photofinisher. This ensures that the reusable components are not damaged. On the other hand, access to the interior of the camera by the consumer/photographer is undesirable because it increases the risk of damage to and/or contamination of the interior of the camera and its reusable components. These considerations are resolved by the particular design of the door 254 provided on the rear cover as shown in FIG. 21, to access the film chamber 204. To facilitate recycling without damage to the camera, the door 254 may be attached to the camera body 202. The opening of the door 254 provides access to the film cassette 208 without damaging or exposing the camera parts attached to the camera body 202. A second door 256 can also be provided on the rear cover on the front cover to be flexibly opened or broken away by the photofinisher to remove the flash battery 250, if desired. See FIG. 21.

Figure 22:
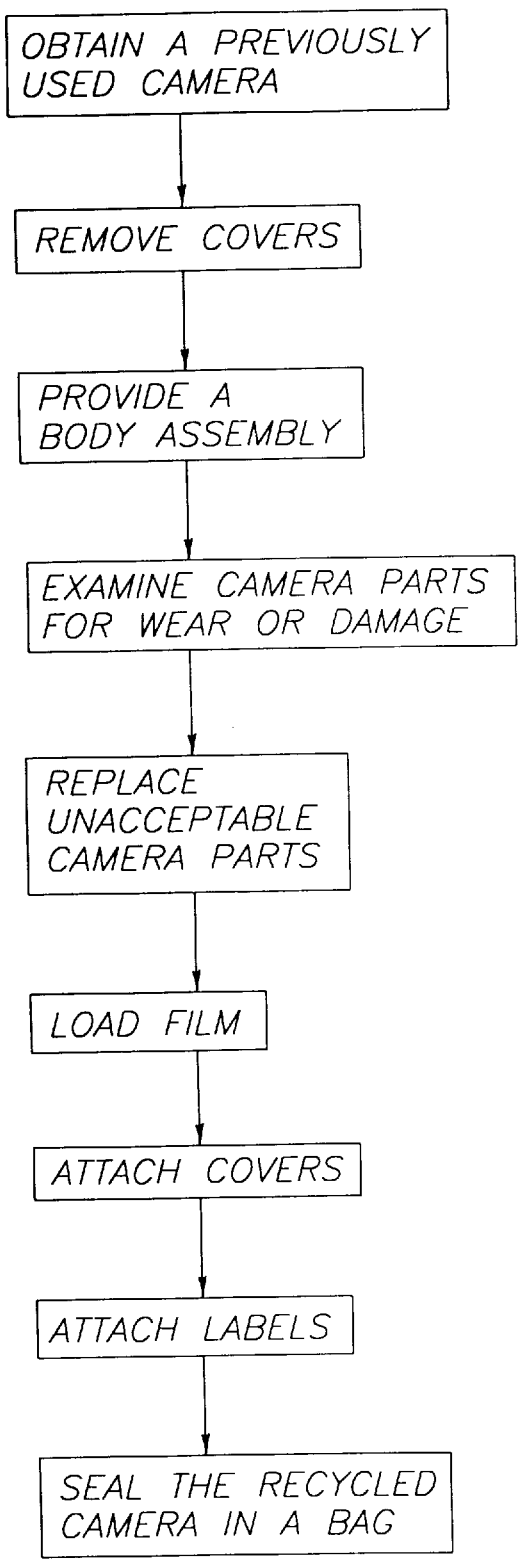
FIG. 22 illustrates a method of making a single use camera from previously used camera parts.

The camera 200 is then turned over to the manufacturer for recycling as will now be described with reference to FIG. 22. The recycling process may comprise the following steps: The front cover 220 and rear cover 230 may be detached from the camera body 202. It should be readily apparent that the covers 220, 230 and body 202 may utilize a number of means for attaching the structural parts together. For example, hook and/or press fitting members may be used, or the parts can be ultrasonically welded together. Thus, each cover may have a suitable number of conventional releasable hook structures, one of which is shown at 262, (FIG. 18) or other attachment means for allowing removal of the covers from the body. The covers may be made from a recyclable plastic such as polystyrene and can be sent to be pulverized. The pulverized material may be blended with virgin materials and new covers or other parts molded therefrom.

The taking lens 212 is also removed. The taking lens may be similarly pulverized with other lenses, blended with virgin materials, and new lenses made therefrom.

Other parts, typically more costly components designed to be reused, such as the main body 202 and the major parts supported by the body, i.e., the viewfinder 218, shutter mechanism 219, film advancing and metering mechanism, and a camera flash unit 100, including the condenser lens element 130, etc. may be examined carefully for wear or damage.

Those parts deemed damaged or worn may be removed from the body 202 and replaced with new parts. Those remaining reusable parts, such as the camera flash unit 100, shutter mechanism 219, etc., that can be reused, remain supported by the camera body, for construction into a camera.

A new front cover 220 is then fitted to the front face of the body 202 and an unexposed roll of film 209 contained within a fresh film cassette 208 (FIGS. 20, 21) is loaded into the film cartridge chamber 204. A new rear cover 230 is then attached to the camera body.

The film 209 is then prewound so that the film is wound back into the cassette 208 as the film is being exposed.

At least one wind and trip check (film advance and shutter actuation) may be done to simulate taking a picture, thereby bringing the counter down to 24 (assuming a 24 exposure roll). The camera then may be inserted into a cardboard casing or a label such as 252 may be attached thereto by adhesive. The recycled camera 200 then may be sealed in a foil wrap, plastic bag or the like, for protection against environmental extremes such as excessive humidity, and packaged in an outer cardboard box for sale. The recycled single use camera, utilizing previously used single use camera parts, such as a camera flash unit 100 is now fully assembled and ready for consumer use.

The foregoing description of the invention is merely exemplary and minor changes and modifications to the invention as described are possible and wholly within the scope of the invention as set forth in the appended claims.

PARTS LIST 13 plasma
14,15,16,17,18,19 light rays
25 target surface
100 Camera flash unit
102 a reflector
102A–102D mounting arms
110 walls forming a trough
110A reflective inner surface walls
111 wings
112 tabs
114 first segment
116 second segment
120 flash lamp tube
120A conductive coating
120B glass wall
121 direct rays
122 clips
123 anode
124 cathode 122' reflected rays
123'>
124'> >Light rays propagating through the condenser lens element
125'>
130 condenser lens element
  surface 1 (front side)
  surface 2 (back side)
  rear vertex Vr; Transition zone T
131 Fresnel facets
132 ridges
140 side walls
140A reflective inner surface of the side walls 140
150 support wall
151 trigger wire
200 single-use camera
202 body
204 film cassette chamber
206 take-up chamber
207 exposure gate
208 film cassette
209 film
211 reuse indicator
212 taking lens
214 retainer
215 aperture
216 lens plate
218 viewfinder
219 shutter mechanism
220 front cover
222 keeper plate
223 spring
223A depressible bottom
224 shutter blade
226 high energy lever
227 helical spring
228 thumbwheel
229 film advance & metering mechanism
230 rear cover
232 sprocket
234 rotatable cam
236 metering lever
238 spring
240 frame counter
242 baffle
246 capacitor
248 circuit board
250 battery
252 label
254 first door
256 second door
262 releasable hook structure

What is claimed is:

1. A camera flash unit comprising:
   (i) a flash light source providing light;
   (ii) a reflector adjacent to one side of said flash light source and adapted to direct some of the light from said flash light source in a first direction, said reflector having a trough with a reflective surface facing said flash light source, said reflective surface partially enclosing said flash light source and not extending more than 2 millimeters beyond said flash light source in said first direction; and
   (iii) a lens element having an optical axis and located adjacent to another side of a said flash light source and directing the light (1) reflected by the reflector and (2) directly incident from said flash light source in said first direction, wherein said lens element and said trough define a distance d, so that d<7 millimeters, where said distance d is measured along the optical axis of said lens element, from a front vertex of said lens element to a back surface of said trough.

2. A camera flash unit according to claim 1 wherein 3 mm<d<5 mm.

3. A camera flash unit according to claim 2 wherein
   (i) said flash light source is a cylindrical flash light source; and
   (ii) said reflective surface of said trough has a depth of less than 2 millimeters.

4. A camera flash unit according to claim 1 wherein
   (i) said flash light source is a cylindrical flash light source;
   (ii) said reflective surface is a concave surface with a radius of curvature in the range of 1 to 3 millimeters; and
   (iii) said reflective surface does not extend more than 1 millimeter beyond said flash light source in said first direction.

5. A camera flash unit according to claim 3 wherein said trough has a length of 7 to 25 millimeters.

6. A camera flash unit according to claim 4 wherein said trough has a length of 7 to 25 millimeters.

7. A camera flash unit according to claim 6 wherein said length is between 7 and 18 millimeters.

8. A camera flash unit according to claim 7 wherein said reflector has reflective wings adjacent to said trough.

9. A camera flash unit for illumination of a target surface comprising:
   (i) a cylindrical flash light source providing light;
   (ii) a reflector adjacent to one side of said flash light source and adapted to direct some of the light from said flash light source to the target surface, said reflector having a cylindrical channel with a concave reflective surface facing said flash light source, said concave reflective surface being defined by a radius of curvature that is substantially the same as the radius of curvature of said flash light source, said reflective surface not extending more than 2 millimeters beyond said flash light source towards the target surface;
   (iii) a lens element having an optical axis and located adjacent to another side of a said flash light source and adapted to direct the light (1) reflected by the reflector and (2) directly incident from the light source to the associated target surface; and
   wherein said lens element and said cylindrical channel define a distance d, so that 2 mm<d<6 mm, where said distance d is measured along the optical axis of said lens element from a front vertex of said lend element to a back surface of said cylindrical channel.

10. A camera flash unit according to claim 9 wherein said reflector has reflective wings adjacent to said cylindrical channel.

11. A camera flash unit according to claim 9 wherein said radius of curvature of said concave surface in the range of 1 millimeter to 3 millimeters.

12. A camera flash unit according to claim 11 wherein said cylindrical channel has a length of 7 to 25 millimeters.

13. A camera flash unit according to claim 9 wherein lens element has optical power in two orthogonal direction.

14. A camera flash unit according to claim 13 wherein said lens element has a hybrid refractive/TIR surface.

15. A camera flash unit according to claim 9 further comprising a trigger wire, said trigger wire being in contact with said reflector, and said reflector being in contact with said flash light source.

16. A camera flash unit according to claim 9, wherein said reflector further includes mounting arms, said mounting arms being adjacent to said cylindrical channel.

17. An electronic flash camera comprising:
(i) a camera body having first and second film chambers;
(ii) a taking lens supported by said camera body;
(iii) a flash board supported by said camera body; and
(iv) a camera flash unit of claim 9 mounted in said flash board.

18. A single use electronic flash camera comprising:
a camera body having first and second film chambers;
a taking lens supported by said camera body;
a flash board supported by said camera body;
a flash unit having a reflector, a flash lamp tube and a condenser lens element mounted in said flash board, said reflector having a trough with a reflective surface partially enclosing said flash lamp tube and not extending more than 1 millimeter beyond said flash lamp tube in a direction of said condenser lens element; and
an unexposed roll of film disposed in one of said film chambers.

19. The single use flash camera of claim 18, wherein said flash board has a reuse indicator.

20. The single use flash camera of claim 19, wherein the camera body further comprises a film spool supported for rotation within the body, and the film is prewound on said film spool.

21. The single use flash camera of claim 19, wherein said camera body further supports at least one previously used single use camera part selected from the group consisting of a viewfinder, a taking lens, a shutter mechanism, and a film advance and metering mechanism.

22. A method of making a single use camera with an electronic flash unit from previously used single use camera parts comprising the steps of:

obtaining a previously used camera body assembly including
(i) a camera body having two film chambers and a taking lens;
(ii) a flash unit having a reflector, a flash lamp tube and a condenser lens element mounted in said flash board, and said reflector having a trough with a reflective surface partially enclosing said flash lamp tube and not extending more than 1 millimeter beyond said flash lamp tube in a direction of said condenser lens element; and loading an unexposed roll of film into the film cassette chamber of the camera body.

23. The method of claim 22, further comprising the step of: determining which, if any, of the previously used camera components must be replaced with new parts.

24. The method of claim 23, further comprising the steps of:
supporting the camera body within a previously used front cover and rear cover; and
attaching a paper-based material around the covers.

25. The method of claim 23, further comprising the steps of:
(i) removing the taking lens from the previously used camera body and replacing it;
(ii) replacing, if necessary, previously used parts selected from the group consisting of the camera body, shutter mechanism, and film advance and metering mechanism with corresponding new parts; and
(iii) attaching, as necessary, a new front cover and a new rear cover to the camera body.

26. The method of claim 23, further composing the steps of: attaching a paper-based material around the front and rear covers; and sealing the recycled camera in a bag to preserve the unexposed roll of film loaded therein.

* * * * *